United States Patent
Bordegnoni et al.

(10) Patent No.: US 11,440,191 B2
(45) Date of Patent: Sep. 13, 2022

(54) AUTOMATED DEVICE WITH A SENSORIZED COVERED MOVABLE STRUCTURE, IN PARTICULAR A ROBOT

(71) Applicant: Comau S.p.A., Grugliasco (IT)

(72) Inventors: Stefano Bordegnoni, Albese County Cassano (IT); Alberto Vizio, Grugliasco (IT); Gabriele Cingano, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 74 days.

(21) Appl. No.: 16/757,545

(22) PCT Filed: Oct. 16, 2018

(86) PCT No.: PCT/IB2018/057993
§ 371 (c)(1),
(2) Date: Apr. 20, 2020

(87) PCT Pub. No.: WO2019/082019
PCT Pub. Date: May 2, 2019

(65) Prior Publication Data
US 2021/0197381 A1 Jul. 1, 2021

(30) Foreign Application Priority Data
Oct. 26, 2017 (IT) .................. 102017000121883

(51) Int. Cl.
*B25J 9/16* (2006.01)
*B25J 13/08* (2006.01)
(Continued)

(52) U.S. Cl.
CPC ........... *B25J 9/1676* (2013.01); *B25J 9/0009* (2013.01); *B25J 13/081* (2013.01); *B25J 19/063* (2013.01); *B66F 9/063* (2013.01); *G08C 23/04* (2013.01)

(58) Field of Classification Search
CPC ...... B25J 9/0009; B25J 9/1676; B25J 13/081; B25J 19/063
See application file for complete search history.

(56) References Cited

U.S. PATENT DOCUMENTS 9,272,415 B2  3/2016  Nogami et al.
D834,082 S   11/2018  Bordegnoni et al.
(Continued)

FOREIGN PATENT DOCUMENTS

BE  1004639 A5  1/1993
EP  2756936 A1  7/2014
(Continued)

OTHER PUBLICATIONS

Peter Heiligensetzer: "Betriebs-und Montageanleitung_KR_5_SI_2.x_V KR_C4"; ,Nov. 12, 2013 (Nov. 12, 2013). XP055340430, Retrieved from the Internet: URL:MRK <> documentation [retrieved on Jan. 30, 2017] pp. 9-11, 29, 50-61.
(Continued)

*Primary Examiner* — Dale Moyer
(74) *Attorney, Agent, or Firm* — Young Basile Hanlon & MacFarlane, P.C.

(57) ABSTRACT

An automated device has a movable structure covered at least in part by a sensorised covering. The sensorised covering comprises a plurality of covering modules, which includes one or more sensorised covering modules. Each sensorised covering module includes a plurality of distinct layers stacked on top of one another and including a load-bearing layer and at least one cushioning layer. Each sensorised covering module integrates at least one contact sensor device (C), which includes a first lower electrically conductive layer (61) and a second upper electrically conductive layer (63), set between which is an electrically insulating layer (62).

16 Claims, 14 Drawing Sheets

(51) Int. Cl.
  *B25J 9/00* (2006.01)
  *B25J 19/06* (2006.01)
  *B66F 9/06* (2006.01)
  *G08C 23/04* (2006.01)

(56) References Cited

U.S. PATENT DOCUMENTS

| | | | |
|---|---|---|---|
| 10,245,729 | B2 | 4/2019 | Bordegnoni et al. |
| D850,506 | S | 6/2019 | Bordegnoni et al. |
| 2003/0137219 | A1 | 7/2003 | Heiligensetzer et al. |
| 2011/0307097 | A1 | 12/2011 | Colledani et al. |
| 2016/0089779 | A1 | 3/2016 | Hahakura et al. |
| 2017/0334076 | A1 | 11/2017 | Bordegnoni et al. |
| 2019/0091871 | A1* | 3/2019 | Alspach ............ G01L 5/009 |
| 2019/0368658 | A1* | 12/2019 | Sato ............ F16P 3/148 |
| 2019/0368950 | A1* | 12/2019 | Kawaguchi ............ B25J 19/063 |
| 2021/0080293 | A1* | 3/2021 | Roziere ............ G01R 27/2605 |

FOREIGN PATENT DOCUMENTS

| | | |
|---|---|---|
| EP | 3147752 A1 | 3/2017 |
| JP | S5855888 U | 4/1983 |
| JP | S63238502 A | 10/1988 |
| JP | 2007102719 A | 4/2007 |
| JP | 2010010116 A | 1/2010 |
| JP | 2012218139 A | 11/2012 |

OTHER PUBLICATIONS

Peter Heiligensetzer; "Betriebs-und Montageanleitung_KR_5_S1_2.x_V KR_C4" Nov. 12, 2013 (Nov. 12, 2013) XPO55340430. Retrieved from the Internet: URL:no url, manufacture documentation [retrieved on Jan. 30, 2017] *p. 9-12, 51-61*.

Barbara Asseburg; "Kollisionkraftmidernde Schaumabdeckung für Industrieroboter". Jan. 1, 2005 (Jan. 1, 2005), p. 2, XP055341305; Retrieved from the Internet: URL:no url, manufacture documentation [retrieved on Feb. 1, 2017].

Barbara Asseburg; "Kollisionkraftmidernde Schaumabdeckung fÃ¼r Industrieroboter". Jan. 1, 2005 (Jan. 1, 2005), p. 2, XP055341305; Retrieved from the Internet: URL:no url, manufacture documentation [retrieved on Feb. 1, 2017].

* cited by examiner

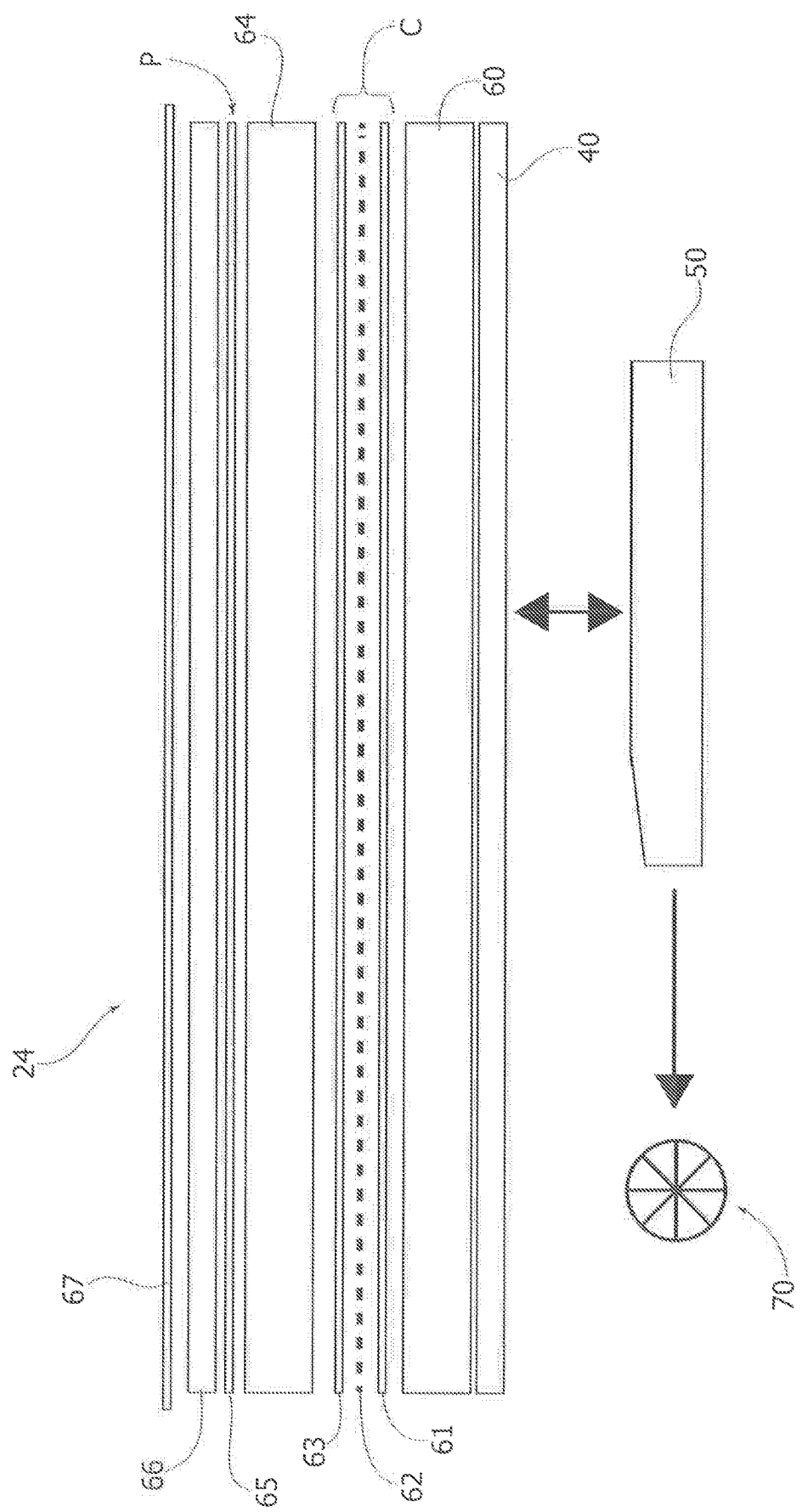

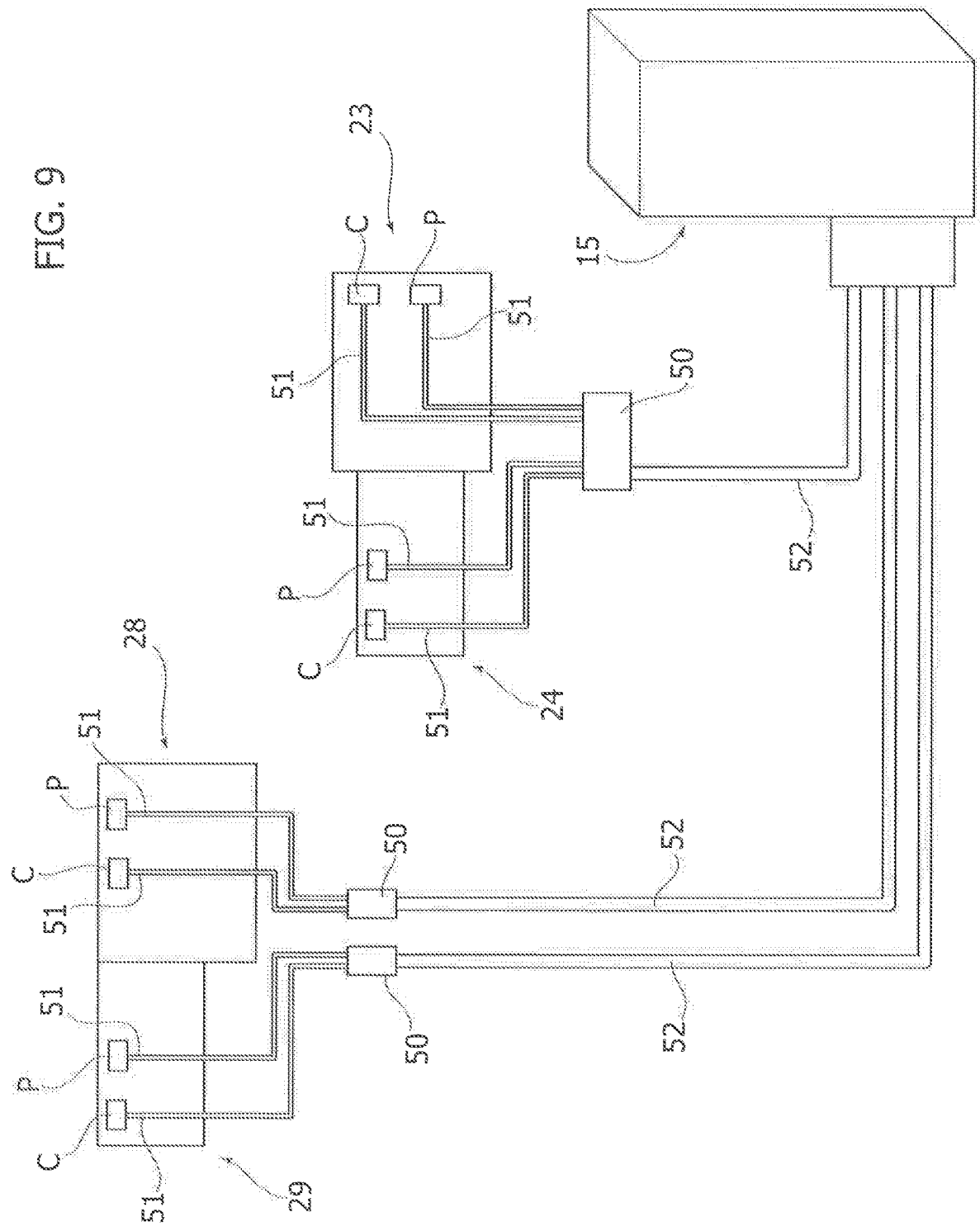

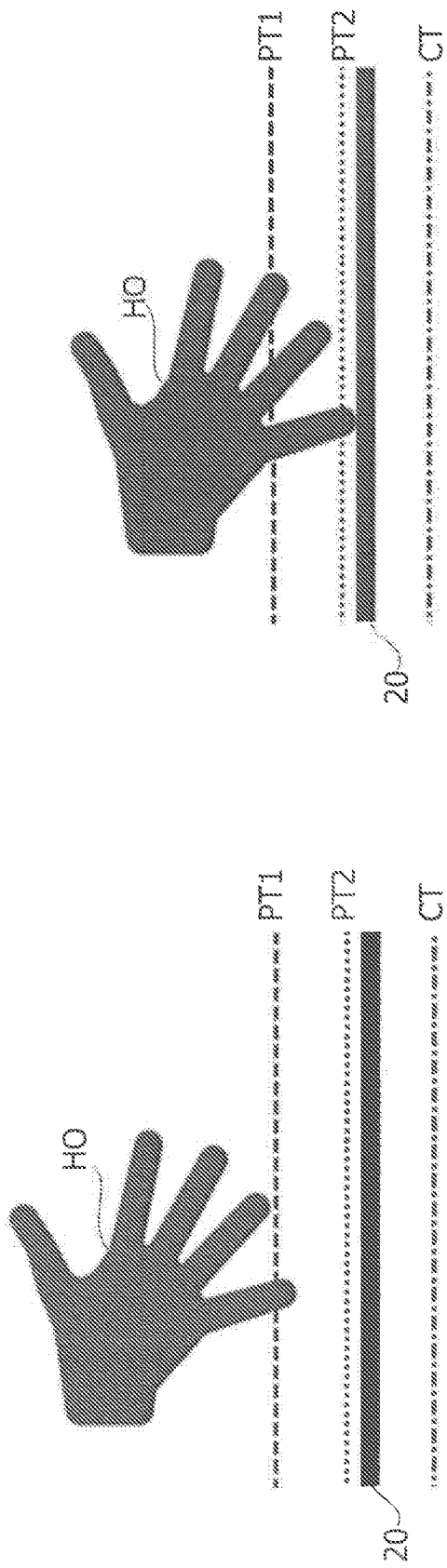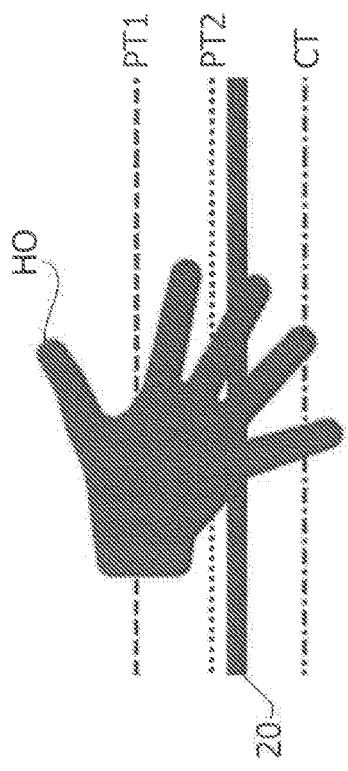

AUTOMATED DEVICE WITH A SENSORIZED COVERED MOVABLE STRUCTURE, IN PARTICULAR A ROBOT

CROSS-REFERENCE TO RELATED APPLICATIONS

This application is filed pursuant to 35 USC 371 claiming priority benefit to PCT/IB2018/057993 filed Oct. 16, 2018, which claims priority benefit to Italian Patent Application No. 102017000121883 filed Oct. 26, 2017, the entire contents of both applications incorporated by reference in their entirety.

FIELD OF INVENTION

The present invention relates to automated devices used in the sector of industrial production and has been developed with particular reference to the issue of co-operation between a human operator and such an automated device. The invention finds preferred application in the sector of robotics, but can advantageously be implemented also on other devices used in the sector of industrial production.

BACKGROUND

In order to exploit effectively the contribution of automation in production processes, and thereby increase the efficiency of the latter, it is necessary to render interaction between human operators and automated devices, in particular robots, natural and safe. In this way, human operators can be entrusted with those processes that require an excessively complex automation, whereas the operations that require, for example, considerable effort, rapidity of execution, high precision, and quality can be entrusted to automated devices.

To render possible these production procedures, solutions are necessary that render human interaction with automated devices natural and safe. The approaches currently followed for this purpose are basically linked to the issues of passive and active safety.

With specific reference to industrial robots, the methodologies linked to an increase in passive safety in the interaction between a human operator and the manipulator of a robot are basically aimed at modifying the structure and operation of the latter in order to reduce the likelihood of accidents and their seriousness. According to this approach, there have for example been proposed robot manipulators distinguished by light structures, covered with soft materials without sharp corners or edges in order to minimise the harm caused by any possible impact on a human operator.

The methodologies linked to the increase in active safety regard, instead, control strategies based upon a dedicated sensor system, aimed at guaranteeing a constant monitoring of the environment that surrounds the robot manipulator in order to modify dynamically its behaviour in the case of potentially risky situations, such as approach of a human operator to the manipulator or contact between the operator and the manipulator during execution of a given function. The types of sensors currently used for this purpose are basically the following:

sensors aimed at reconstructing optically the geometry of the environment surrounding the manipulator, such as video cameras and laser scanners;

electrical sensors aimed at recognising contact or collision between the manipulator and a human operator, such as force or contact sensors; and electrical sensors aimed at recognising excessive approach between the manipulator and a human operator, such as proximity sensors.

Robots have been proposed in which the two strategies of passive and active safety are integrated in a sensorised covering or coating of the corresponding manipulator. These coverings are in general constituted by a sort of "skin", prevalently made of elastically compliant material that envelops a corresponding part of the manipulator and that integrates contact sensors or else proximity sensors.

Mounting of the aforesaid known coverings on the movable structure of the manipulator is in general complicated and far from practical. Also the corresponding removal or replacement of the covering or parts thereof in the case of occasional faults is laborious. Moreover, integration and calibration of the sensor means in the covering is frequently complicated and costly. Similar problems are found also in automated devices with movable parts other than robots, used in the sector of industrial production.

SUMMARY

The aim of the present invention is basically to provide an automated industrial device, in particular a robot, provided with a sensorised covering that is substantially free from the drawbacks referred to above, albeit capable of ensuring a high degree of co-operation between the device and a human operator, at the same time guaranteeing the necessary safety requirements. According to a different aspect, the aim of the present invention is to provide an automated industrial device in which the operating states or conditions of a corresponding sensorised covering can be readily detected.

The above and other aims still, which will emerge clearly hereinafter, are achieved according to the present invention by an automated industrial device and by a sensorised covering for an automated industrial device having the characteristics referred to in the attached claims.

The claims form an integral part of the technical teaching provided herein in relation to the invention.

BRIEF DESCRIPTION OF THE DRAWINGS

Further aims, characteristics, and advantages of the present invention will emerge clearly from the ensuing description and from the annexed drawings, which are provided purely by way of explanatory and non-limiting example and in which:

FIG. 6 is a schematic cross-sectional representation of a possible layered configuration of a covering module of a sensorised covering according to possible embodiments of the invention;

FIG. 9 is a partial and schematic illustration of a possible configuration of electrical connection of some covering modules of a sensorised covering according to possible embodiments of the invention;

FIGS. 15, 16, and 17 are schematic representations aimed at indicating possible conditions of operation of a sensorised covering according to possible embodiments of the invention.

DETAILED DESCRIPTION

Reference to "an embodiment" or "one embodiment" in the framework of this description is intended to indicate that a particular configuration, structure, or characteristic described in relation to the embodiment is comprised in at least one embodiment. Hence, characteristics described with reference to "an embodiment", "one embodiment", "at least one embodiment", "one or more embodiments", and the like, in various points of this description, do not necessarily all refer to one and the same embodiment. Moreover, the particular configurations, structures, or characteristics may be combined in any adequate way in one or more embodiments. The references used in what follows are provided only for convenience and do not define the sphere of protection or the scope of the embodiments.

It is moreover pointed out that in the sequel of the present description the automated devices in relation to which possible embodiments of the invention are exemplified will be described limitedly to the elements useful for an understanding of the invention.

Figure 1:
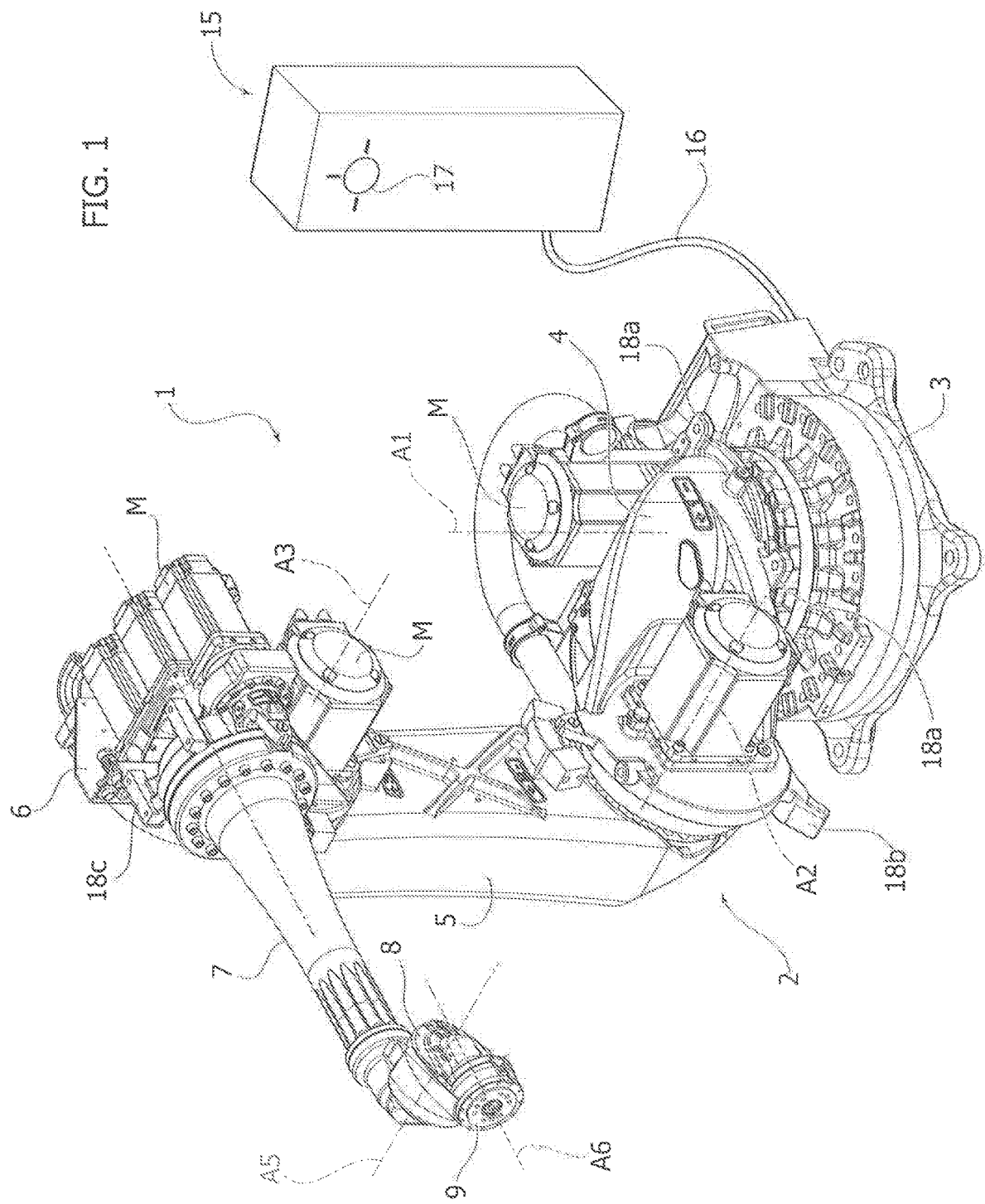
FIG. 1 is a partial and schematic perspective view of an automated device according to possible embodiments of the invention.

Represented schematically in FIG. 1 is an automated device for use in industrial production, according to possible embodiments of the invention. In the example illustrated, the device is a robot that comprises a manipulator 1 with a number of degrees of freedom, having a movable structure 2 that includes a plurality of parts connected together, as well as actuator means that can be controlled for causing displacements of the aforesaid parts of the structure 2.

In the example illustrated, the robot is an anthropomorphic robot with six degrees of freedom having a stationary base 3 and a column 4 rotatably mounted on the base 3 about a first axis A1 with vertical direction. Designated by 5 is an arm mounted oscillating on the column 4 about a second axis A2 with horizontal direction. Designated by 6 is a elbow, mounted on the arm 5 for turning about a third axis A3, which also has a horizontal direction, the elbow 6 supporting a forearm 7, designed to turn about its own axis A4, which consequently constitutes a fourth axis of movement of the manipulator 1. The forearm 7 is provided at its end with a wrist 8, mounted for movement according to two axes A5 and A6. The wrist 8 has a flange 9 for mounting of an end effector, not represented. The end effector may be a device for picking up a generic component, for example, of the type illustrated in FIG. 10, or else a polishing or grinding device, for example, of the type represented in FIG. 12. The aforementioned end effector may in any case be of any type and function known in the sector, for example a welding torch or yoke, a paint-spray gun or a gun for application of a sealant, a drilling spindle, etc.

The movable parts 4-8 are connected together by means of joints of a known type, associated to which are respective electric motors, some of which are designated by M, with corresponding gear-reducer transmission. In one or more embodiments, also the end effector associated to the flange 9 has respective actuator means, according to a technique in itself known. Preferentially associated to the aforesaid joints, i.e., to the corresponding motors M, are corresponding transducers (not illustrated), for example of an encoder or resolver type, for control of position.

The movements of the manipulator 1, i.e., operation of the motors of the joints, are managed by a robot control unit 15, which is preferentially located in a position remote from the manipulator 1 and is connected to the electrical/electronic parts of the latter via the leads of a wiring system 16. The modalities of practical implementation of the hardware and of the software regarding the unit 15, which is provided with a respective microprocessor control system, are irrespective of the aims of the present description, apart from some specific functions referred to hereinafter, which regard possible embodiments of the invention.

In one or more embodiments, the control unit 15 is configured for controlling the manipulator 1 in a plurality of different operating modes, amongst which at least an automatic operating mode and preferably also a manual operating mode. For this purpose, the unit 15 comprises a selection device 17, which can be operated by a user for selecting a desired operating mode out of the possible ones. In at least one embodiment, the robot may be operated at least in a "programming" mode, an "automatic" mode, and, preferably, a "remote" mode. In FIG. 1, the reference 17 hence exemplifies a device for manual selection of the desired operating mode out of the possible ones. In the "programming" mode, an operator acts in the vicinity of the manipulator, to govern operation thereof, store the program steps, and program the operating activity, for example by means of a portable programming device (teach pendant) or a manual guiding device associated to the movable structure of the manipulator 1, in particular in the vicinity of its end effector. In the "automatic" mode, the robot executes, instead, a pre-stored operating program of its own, possibly in combination with other robots or automatic apparatuses, and possibly co-operating with a human operator for executing a specific task. Also in the "remote" mode, the robot executes an operating program of its own within a work cell, possibly co-operating with a human operator, but in this case start-up of execution of the program comes from a cell supervisor, such as a PLC, which for example controls both the robot and other automated apparatuses present in the same cell.

FIG. 1 is a schematic illustration of the manipulator 1 in a "naked" version thereof, in order to clarify a possible conformation of its movable structure 4-8. However, in practical embodiments of the invention, the aforesaid movable structure is covered at least in part by a sensorised covering, visible in FIGS. 2 and 3, where it is designated as a whole by 20. In one or more embodiments, such as the one represented, the covering 20 covers at least in part also the stationary structure of the manipulator 1, here represented by its base 3.

The covering 20 integrates sensor means, which may include at least one contact sensor device, suitable for detecting contact or impact between the manipulator 1 and a foreign body, and/or at least one proximity sensor device, suitable for detecting the presence of a foreign body within a substantially predetermined distance from the manipulator, for example between approximately 0 cm and 5 cm, preferably between 0 cm and approximately 3 cm. In various preferred embodiments, the covering integrates both at least one contact sensor device and at least one proximity sensor device. Given that, in its preferred applications, the robot is a robot of a collaborating type, the aforementioned foreign body is typically represented by a human operator, who operates in strict contact with the manipulator 1.

Figure 2:
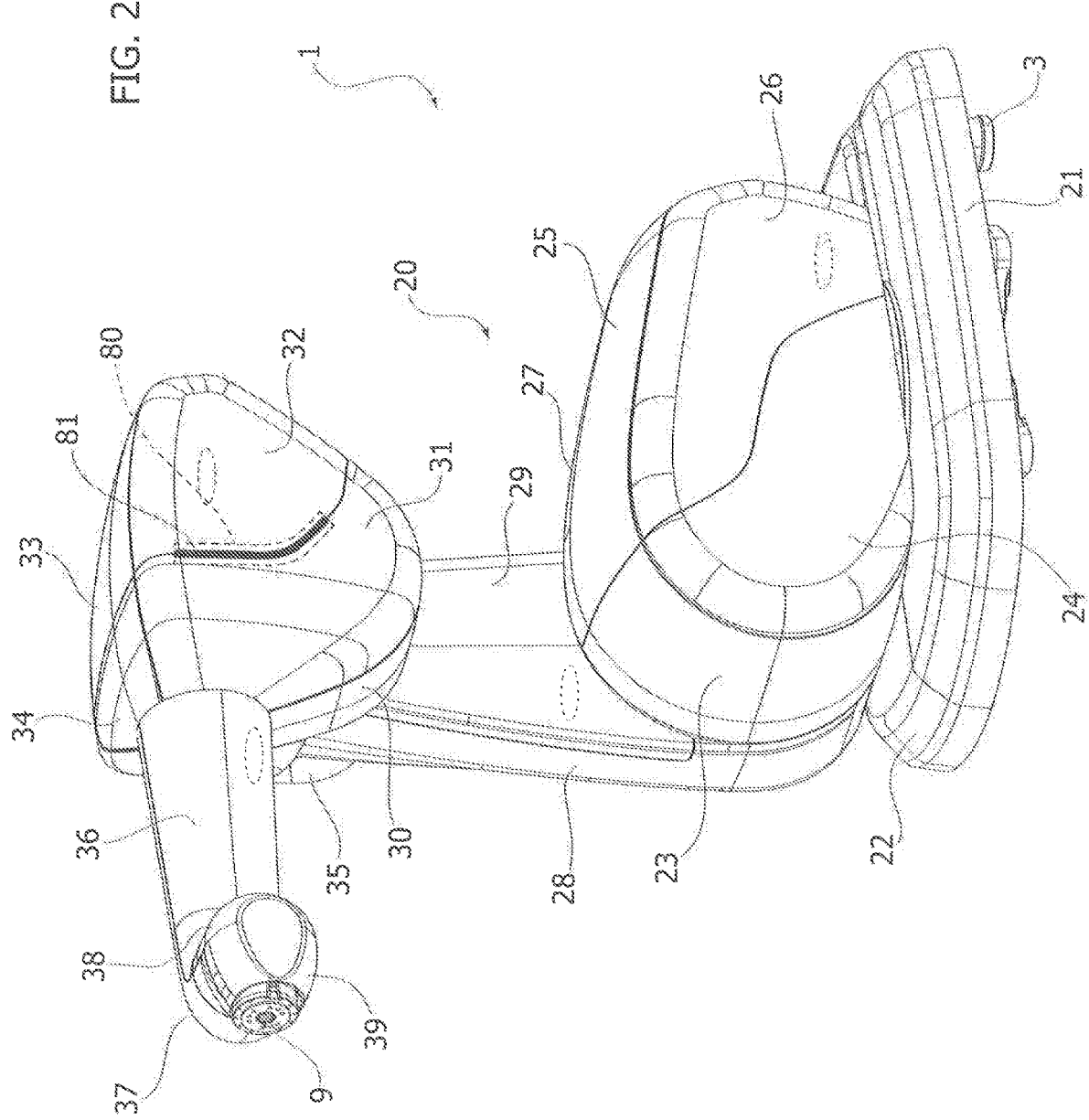
FIG. 2 is a schematic perspective view of a part of the device of FIG. 1, with a sensorised covering according to possible embodiments of the invention.

The sensorised covering 20 comprises a plurality of covering modules, some of which are designated by the reference numbers 21 to 39 only in FIG. 2, which can be put together or assembled to form as a whole a sort of body that covers at least part of the movable structure of the manipulator 1, preferably but not necessarily practically the entire movable structure 4-8 of the manipulator.

As will emerge more clearly hereinafter, at least some of the modules 21-39 of the covering 20 have a respective load-bearing or supporting structure, having a predefined shape, associated to which is at least one layer of elastically compressible material, i.e., one designed to absorb impact. In preferred embodiments, the load-bearing or supporting structure of each module is made of rigid or semi-rigid material so that the aforesaid structure may be prearranged with any desired predefined shape, which varies according to the part of the manipulator 1 (or other automated device) that is to be covered.

The plurality of modules 21-39 comprises one or more sensorised covering modules, which each include respective sensor means, for example contact sensor means and/or proximity sensor means. In the sequel of the present description, a possible embodiment of the aforementioned sensorised modules will be exemplified with reference to the modules designated by 23 and 24, taking for granted that the concepts described in relation to the aforesaid modules can be applied also to other sensorised modules, for example, the ones designated by 25-26, 28-29, 31-32, 36-37, 38-39 (apart obviously from the different overall shape of the modules in question, determined by the corresponding load-bearing structure).

In preferred embodiments, the sensorised modules include both at least one contact sensor device and at least one proximity sensor device. On the other hand, not excluded from the scope of the invention is the case of at least one of the modules of the covering 20 being provided only with a contact sensor device, or else only with a proximity sensor device. The covering 20 may also include modules without sensor devices of the type referred to, for example in areas of the manipulator 1 for which the risks or consequences deriving from any possible impact with a human operator are low; for example, the covering modules 21-22 of the base 3 of the manipulator 1 could be without sensor devices, or else be provided with just proximity sensor devices, on account of the fact that the base 3 is in any case a stationary part of the manipulator. Similar considerations may apply to modules associated to movable parts of the manipulator 1, for example the module 33.

In various embodiments, at least some of the modules of the covering are prearranged for being fixed in a separable way to corresponding underlying parts of the movable structure 4-8, such as the modules 23, 25 and 36, 37 of FIG. 2. For this purpose, the aforesaid underlying parts of the manipulator 1 have purposely provided positioning and/or attachment elements for respective covering modules. The aforesaid elements may be defined directly by the body of the parts of the manipulator, or else be configured as elements applied on the aforesaid parts.

With reference, for example, to FIG. 1, designated by 18*a* are, for example, two brackets for anchorage of the modules 23 and 25 of FIG. 2, designated by 18*b* is a positioning and/or resting element for the module 23, whereas designated by 18*c* is a bracket for anchorage of the module 34 of FIG. 2.

In various embodiments, fixing of the modules to the aforesaid positioning and/or attachment elements is provided by way of additional mechanical connection elements. For instance, in FIG. 3, where the module 24 is separate from the modules 23 and 26, partially visible is an element 19 for mechanical connection of the module 23 to the attachment element 18*a* of the column 4 of the manipulator 1. On the other hand, in possible embodiments, the load-bearing structure itself of the modules that are to be secured to parts of the manipulator 1—which is, for example, made of plastic or composite material—may be shaped so as to define directly at least part of the necessary elements for mechanical connection and/or coupling to the structure 2 of the manipulator 1.

In one or more preferred embodiments, one or more first covering modules—for example, the modules 23 and 25—are secured in a separable way to respective parts of the movable structure (the column 4, with reference to the modules 23 and 25 exemplified), in particular via fast-coupling arrangements, for example, members with snap-action or quick-connect engagement devices.

In one or more embodiments, one or more second covering modules—for example, the modules 24 and 26—are secured in a separable way to one or more of the aforesaid first modules and/or are secured in a mutually separable way, in particular by means of fast-coupling arrangements, for example members with snap-action or quick-connect engagement devices. For instance, the modules 24 and 26 can be coupled in a separable way to the modules 23 and 25, respectively, which are in turn coupled in a separable way to the structure of the manipulator. Moreover, as will emerge more clearly hereinafter, the modules 24 and 26 are coupled together in a separable way.

As has been said, preferentially, the means for separable coupling of the covering modules with respect to one another and/or with respect to the movable structure of the manipulator comprise fast-coupling arrangements, such as releasable clips with snap-action or quick-connect engagement. On the other hand, in alternative embodiments, separable fixing of one or more modules with respect to the structure 2 and/or with respect to one another could be obtained using threaded members, such as screws and the like.

In one or more embodiments, modules of the covering 20 are provided that have associated at least one electronic control board, not necessarily fixed to the corresponding load-bearing structure. The aforesaid control board is connected in signal communication with the control unit 15 of the manipulator 1, and electrically connected thereto are the sensor means of at least one corresponding sensorised covering module.

The aforesaid control board is preferentially prearranged for managing at least operation of the sensor means and for supplying to the control unit 15 signals indicating a contact between the manipulator 1 and a human operator (or other foreign body) and/or signals indicating the presence of a human operator (or other foreign body) within a substantially predetermined distance from the manipulator itself. As has been said, in possible embodiments, at least one of the sensorised modules includes contact sensor means and proximity sensor means, so that the corresponding control board is able to supply to the control unit 15 signals indicating both of the aforesaid conditions, namely, signals indicating a contact and signals indicating proximity.

Each sensorised covering module may be associated to a control board of its own, or else one and the same sensorised covering module may be associated to a number of control boards, for example a first board prearranged for management of the contact sensor means of the module in question and a second board prearranged for management of the proximity sensor means of the same sensorised covering module. It is also possible to provide a number of sensorised modules associated to one and the same control board, which is able to manage both the sensor means proper to a first module and the sensor means of at least one second module. With the same logic, moreover, at least one control board can be carried by a non-sensorised covering module, to which the sensor means of at least one sensorised module are connected. It will hence be appreciated that one or more modules of the covering, albeit provided with their own contact sensor means and/or proximity sensor means, do not necessarily have to be equipped with a corresponding control board. In this perspective, the sensor means of one or more sensorised modules without board may also be interfaced directly with the control unit 15, in which the functions of the corresponding board will be directly implemented.

As has been mentioned, in preferred embodiments, one and the same electronic control board is prearranged for connection and control of a plurality of sensorised modules of the covering 20, even more than two modules. The aforesaid same control board does not necessarily have to be carried by one of the modules of the covering, since it may be associated to the structure of the manipulator, even in a position that is relatively far from the controlled sensorised modules.

Figure 3:
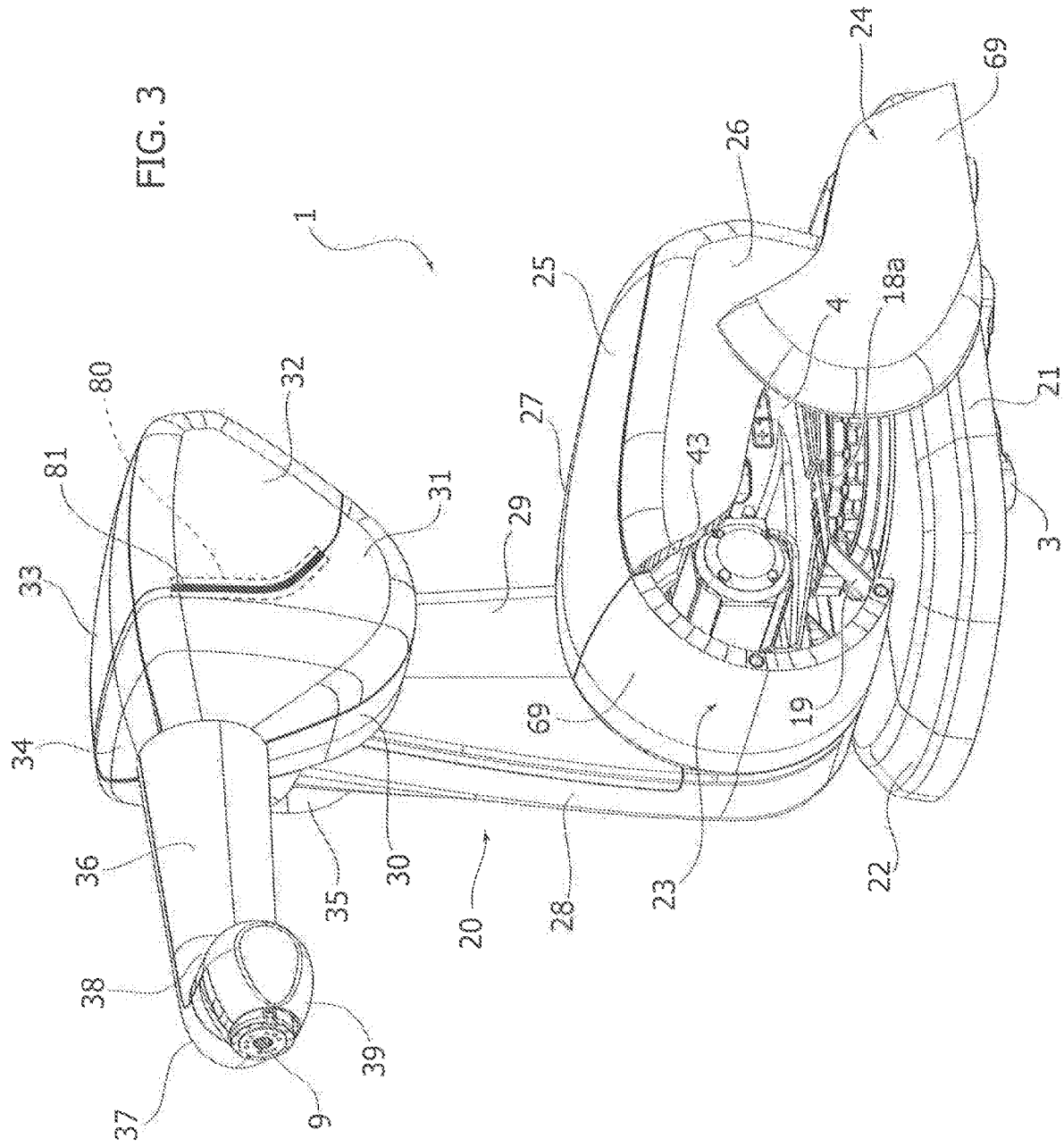
FIG. 3 is a partially exploded view of the part of device of FIG. 2.
Figure 4:
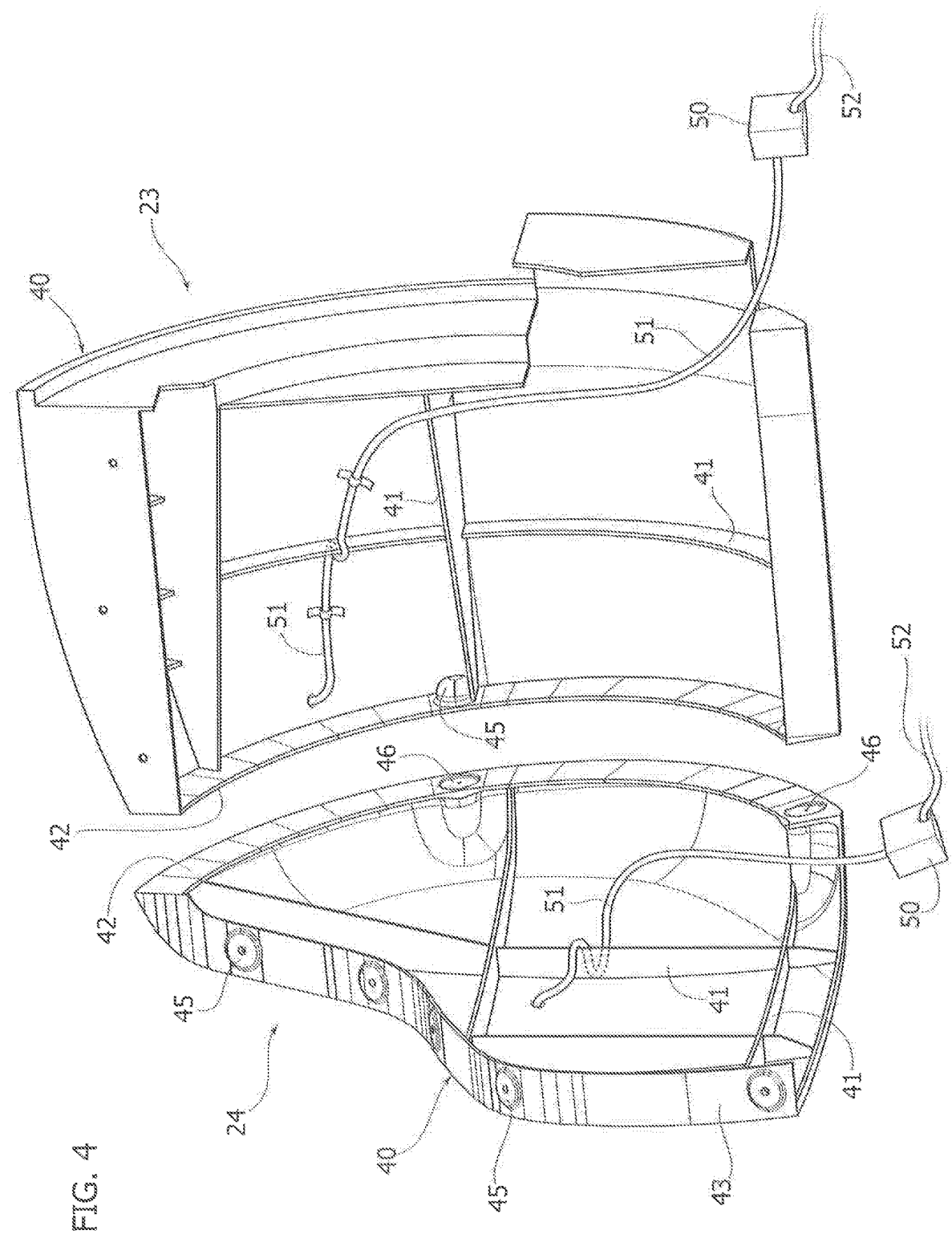
FIGS. 4 and 5 are schematic perspective views of two modules of a sensorised covering that can be used in an automated device, according to possible embodiments, respectively in a condition where they are separate and a condition where they are coupled together.
Figure 5:
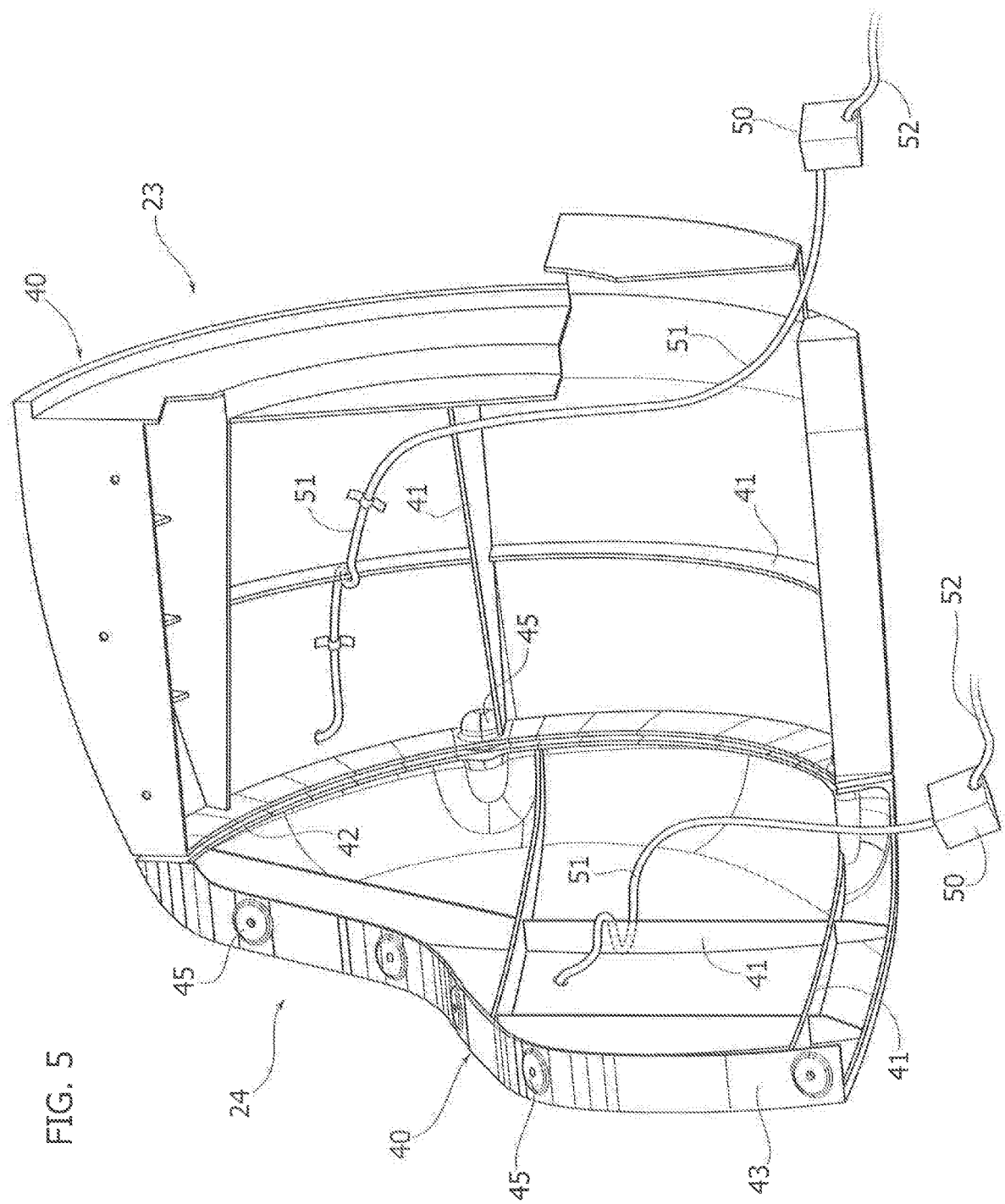

Represented by way of example in FIGS. 4 and 5 are two sensorised covering modules, corresponding to the modules 23 and 24 of FIGS. 2-3. In the aforesaid figures, the inner side of the aforesaid modules is visible, i.e., the side substantially facing the underlying movable structure of the manipulator 1 (here basically the column 4, see FIG. 1).

Visible in the aforesaid figures is the load-bearing or supporting structure of the modules in question, designated as a whole by 40, preferably made of electrically insulating material. As will emerge more clearly hereinafter, in preferred embodiments, the modules of the covering 20 have as a whole a structure with distinct layers, which includes:

at least one load-bearing layer, preferably made of rigid or semi-rigid material, necessary for bestowing a desired predefined shape upon the module;

at least one layer of compressible material, designed to absorb any possible impact; and preferably.

at least one outer coating layer.

In one or more embodiments, the sensorised modules comprise one or more distinct active layers, corresponding to the sensor means provided, and one or more distinct passive layers, corresponding to the structural or load-bearing part of the module, to its elastically compressible part, and to its outer coating. The load-bearing structure 40, which itself constitutes the layer of the covering module, is prearranged for supporting the aforesaid distinct active and passive layers.

The structures 40 of the modules are substantially provided in the form of shells shaped so as to reproduce the shape of the corresponding parts of the manipulator 1, or envelop it or cover it partially, and so as to provide a substantially homogeneous surface for support of the aforesaid active and passive layers, as well as for the covering 20 as a whole.

The structures 40 are preferentially shaped so that defined between their inner side and the underlying parts of the manipulator 1 is a free gap, sufficient for housing, for example, the control electronics of the covering modules and/or the corresponding wiring and/or the possibly projecting elements of the aforesaid covered parts of the manipulator, as well as other possible members, for example members for forced ventilation, such as fans. Of course, for the aforesaid reasons, the structures 40 of the various covering modules will be differentiated from one another, according to the area of the manipulator that is to be covered. In various embodiments, the structure 40, which may indicatively have a thickness of between 2 and 30 m, is made of glass-reinforced plastic or other composite material, and can hence be readily obtained with equipment of a known conception. Not, however, excluded from the scope of the invention is the use of thermoplastic or thermosetting materials and/or formation of the structures 40 via thermoforming or other technologies in themselves known, for example, via three-dimensional printing. The structure 40 itself may possibly be of a multilayer type, for example comprising two stiffer outer layers and at least one less stiff intermediate layer. In various embodiments, the thickness of the structure is variable, i.e., not constant; for example, the structure 40 of a module may be thicker in its portions designed for mechanical connection to the structure of the robot and/or to other modules, and less thick in other portions, for example designed to provide a substrate for the active and passive layers of the covering.

With reference to FIGS. 4 and 5, it may be noted how, in one or more preferential embodiments, the structures 40 are substantially shaped like a patterned shell, preferably defining a more or less pronounced crowning or cavity, the inner side of which can be provided with stiffening ribbings, some of which are designated by 41. The control boards of the modules, when envisaged, may be fixed to the inner side of a respective structure 40, but this does not constitute an essential characteristic, it being possible for the boards to be mounted on the structure of the manipulator 1. As has been said, in preferred embodiments, one or more control boards of the sensorised modules—both in the case of control boards provided for the control of a single module and in the case of control boards provided for control of a plurality of modules—is/are mounted on the load-bearing structure of the manipulator 1, even in a position remote from a corresponding controlled sensorised module. In the non-limiting example represented, both of the modules 23 and 24 are provided with respective control boards, designated by 50 and represented schematically. Fixing of the boards 50 to the structures 40 or else to the load-bearing structure of the manipulator 1 can be carried out according to known technique, for example via threaded members or else by providing brackets or seats for snap-action engagement of the boards 50.

Designated by 51 is a wiring system consisting of a number of leads for connection of the boards 50 to the sensor means of the respective module, which may comprise contact sensors, or else proximity sensors, or else a combination of contact sensors and proximity sensors. Given that the aforesaid sensors are positioned beyond the outer side of the structures 40 (not visible in FIGS. 4-5), the latter may be provided with holes for passage of the wiring 51 or of the leads thereof.

In various embodiments, the load-bearing structure 40 of at least some of the modules has associated mechanical connector elements, for connecting mechanically together, in a separable way, at least two covering modules. In preferential embodiments, the aforesaid mechanical connector elements are of the fast-coupling type, for example with quick-connect engagement.

As exemplified in FIG. 4, in preferred embodiments the structure 40 of a first module—in the example, the module 23—has at least one peripheral surface or wall 42 designed to be set facing a corresponding peripheral surface or wall 42 of a second adjacent module—in the example, the module 24—, where the aforesaid facing surfaces or walls define or have associated the aforesaid connector elements for mechanical connection, designated by 45 and 46. In the example, the connector elements 45 are substantially of a male type, whereas the connector elements 46 are substantially of a female type. Mechanical connectors of the type referred to may be provided also on modules not equipped with sensor means.

In various embodiments (not represented), the load-bearing structure 40 of at least some of the modules may have associated electrical connector elements, for electrically connecting together two covering modules, or the corresponding wiring, in a separable way. Also the aforesaid electrical connector elements may be substantially of a male and female type. If envisaged, the electrical connector elements may be associated to facing walls 42 of two modules to be electrically coupled together, for example the modules 23 and 24, preferably in addition, but possibly also as an alternative, to the mechanical connector elements 45, 46. It should be noted in this regard that the aforesaid electrical connector elements can be prearranged for performing the functions of the aforesaid mechanical connector elements, and vice versa.

It is clear that the structure 40 of a module—also without sensor means—can have a number of surfaces or walls that are designed to face corresponding surfaces or walls of adjacent modules, the aforesaid facing walls having associated respective mechanical connector elements and/or electrical connector elements. FIG. 4 illustrates, in fact, the case where the structure 40 of the module 24 has a surface or wall 43 (here generally transverse or orthogonal to the wall 42 of the module itself) that is provided with mechanical connector elements 45, designed to couple with respective complementary mechanical connector elements provided on the surface or wall of the module 26 designated by 43 in FIG. 3. In addition or as an alternative, on the walls 43 of the modules 23 and 26 electrical connector elements of the type previously referred to could be provided. It is obviously also possible to provide a number of mechanical connector elements and/or electrical connector elements, on one and the same wall 42 or on a number of walls 42, 43 of a first module, designed for separable coupling to complementary mechanical connector elements and/or electrical connector elements carried by corresponding walls of second modules, adjacent to the first.

Once again in FIG. 4, designated by 52 is a wiring for electrical connection of a control board 50 to the control unit 15 of FIG. 1. The supporting structure 40 of the modules may be shaped so as to define, at a peripheral wall thereof, at least one passage for guiding of the wiring, as illustrated for example for the module 23, in relation to the corresponding wiring 51.

As may be appreciated from FIG. 4, the substantially shell-like, generally concave or crowned, shape of the structures 40 enables, if so required, effective housing of the control boards 50, whether these be mounted on the inner side of the structures 40 themselves or else on the structure of the manipulator 1, and of all the wiring 51-52, with the latter that can also be locally anchored to the inner side of the structures 40, for example via adhesive tapes or suitable wire-ways.

In FIG. 5, the modules 23 and 24 are represented in a coupled condition, i.e., with the respective walls 42 of FIG. 4 in contact with or adjacent to one another, and with the mechanical connector elements 45, 46 coupled together. With reference to the aforesaid figure, assume that the ends of the wiring 52 are electrically connected to the control unit 15 of FIG. 1, with some leads of the aforesaid wiring that are used by the control unit 15 for supplying the necessary electrical supply (preferably a low-voltage supply) to the control boards 50, and other leads of the aforesaid wiring that are, instead, used by the control boards 50 for supplying to the control unit 15 the signals indicating detections made by the sensor means, i.e., indicating contact or impact between the manipulator 1 and a human operator (or other foreign body) and/or the presence of a human operator (or other foreign body) in the proximity of the manipulator itself.

In this way, thanks to the independent electrical connections, various sensorised modules of the covering 20—here exemplified by the modules 23 and 24—are able to operate independently of one another, even in the case of failure of one of the modules. An approach of this type evidently enables various possible configurations for the covering 20, which may comprise sensorised modules that substantially cover the entire movable structure of the manipulator 1 or else just a part thereof deemed critical for the purposes of co-operation with a human operator, according to the type of final application of the robot or other automated device.

It will likewise be appreciated that the control unit 15 can be conveniently prearranged for identifying the control board 50 of the sensorised module that supplies one of the aforesaid representative signals, with the control unit 15 that hence recognises the module in question, corresponding to the area of the manipulator where contact and/or proximity of an operator or other foreign body has been detected, in order to implement the necessary actions. Of course, this applies also in the case of an electronic board 50 prearranged for control of a plurality of sensorised modules. In other words, an electronic board 50 of this sort may be conveniently prearranged for identifying which of the controlled sensorised modules has generated a signal and communicating the corresponding information to the control unit 15.

For instance, assuming that the proximity sensor means are configured for detecting the presence of a foreign body within a maximum distance of approximately 5 cm, following upon a detection made via the aforesaid sensor means the control unit can issue a command for reducing the speed of displacement of the manipulator 1 to a value deemed safe for a human operator, for example between 150 and 250 mm/s.

Similar strategies can be implemented following upon a contact caused by a human operator on the manipulator. For instance, assume that, after a reduction of speed caused by a previous signal generated by proximity sensor means, the human operator moves in an unexpected way and accidentally bumps against the surface of a sensorised module.

Following upon the consequent signal generated by the corresponding contact sensor means, the control unit 15 may stop movement of the manipulator 1, or else reverse the direction of movement thereof. It should be noted that the contact made by the operator on the sensorised covering may even be voluntary, for example when the operator wishes to stop operation of the robot.

The fact that the control unit 15 is able to identify the sensorised module from which the contact and/or proximity signals come possibly makes it possible to adopt control strategies aimed at increasing the safety of a human operator, in particular for co-ordinating the movement of a number of parts of the movable structure 2. With reference to FIG. 2, assume, for example, that a contact is detected via the module 39, when the forearm (7, FIG. 1) of the manipulator 1 is located in a position inclined downwards. A possible control strategy may hence envisage that the control unit 15 will issue a command both for raising of the aforesaid forearm and for a simultaneous oscillation backwards (with reference to the view of FIG. 1) of the arm 5. Obviously, this is only a non-limiting example, given that the possible combinations of movements are innumerable.

It will be appreciated that, in one or more embodiments, the control unit 15 may be configured, via appropriate programming, for exploiting the sensorised covering modules as a sort of "user interface", aimed at enabling the human operator to impart basic instructions to the control unit 15.

As already mentioned, a single contact with a sensorised module can be deemed indicative of a situation that is potentially dangerous for a human operator, following upon which safety strategies are implemented. On the other hand, for example, three contacts on a sensorised module that occur in rapid succession (which the operator can perform also with the finger of one hand) may indicate the will of the operator to stop the manipulator temporarily, without the robot having to implement any safety strategy. Starting from the aforesaid condition of controlled arrest, a subsequent sequence of contacts on a module—for example, two or four contacts in rapid succession—may indicate the will of the operator to restart operation of the manipulator.

In various embodiments, adjacent modules of the sensorised covering 20 are not provided with mechanical connector elements and/or electrical connector elements of the type referred to previously. This is typically the case of modules that, albeit rather close to one another, cover parts of the manipulator 1 that are able to move with relative motion.

With reference to FIG. 2, it will be appreciated, for example, that the module 23, on the one hand, and the module 28 (or 29), on the other hand, partially cover the column 4 and the arm 5 of the manipulator 1 (see FIG. 1), respectively, i.e., parts of the manipulator that are able to perform relative displacements. Hence, between the aforesaid modules 23 and 28 no mutual-coupling connector elements, either mechanical or electrical, are provided. Of course, considerations of this sort apply also to other modules of the sensorised covering 20, such as—with reference once again to FIG. 2—the modules 23 or 25 and 29, the modules 29 and 30, the modules 38-39, on the one hand, and the modules 36-37, on the other hand, or once again the modules 30, 31, 34, 35, on the one hand, and the modules 36-37 on the other hand (the modules 36-37 are fixed with respect to the forearm 7, and are hence able to turn therewith with respect to the modules 30, 31, 34, 35 that cover the elbow 6 of FIG. 1).

As mentioned previously, in preferential embodiments, at least the sensorised modules of the covering 20 comprise a plurality of active layers and passive layers carried by the load-bearing structure 40.

In FIG. 6, represented merely by way of non-limiting explanation is a possible structure with distinct layers of a sensorised module, which is here assumed as being the module 24 of FIGS. 4 and 5. In the aforesaid figures the representation of the electrical connection wiring has been omitted, for reasons of greater clarity.

In preferred embodiments, associated to an outer side of the supporting structure 40 of a covering module is at least one cushioning layer, made of elastically compressible and preferably electrically insulating material, for example an elastomeric material, which is designed to absorb kinetic energy deriving from impact on the module in question. A cushioning layer, such as the one designated by 60 in the example of FIG. 6, may be made of a polymeric foam, for example foamed polyurethane. The layer 60 may have a thickness of between 5 and 20 mm, preferably between 8 and 13 mm. Indicatively, the cushioning layer 60 may be provided for absorbing impact with transmitted force according to the standards currently in force, for example the ISO 10218-1, -2, and TS 15066 standards.

It should be noted that, in various preferential embodiments, the outer side of the structure 40 to which the various active and/or passive layers of the corresponding covering are to be associated is shaped so as to have an outer surface as even and regular as possible, for example a plane surface, or else a cylindrical surface, or else a conical surface. Surfaces of this type facilitate application of the various active and/or passive layers on the structure, preventing, for example, formation of creases or wrinkles that may have an adverse effect on the quality of operation of some active layers, such as an electrically conductive layer belonging to a proximity sensor or else to a contact sensor.

In one or more embodiments, provided on the upper side of the cushioning layer 60 of a sensorised module are contact sensor means.

In general, the contact sensor means may be of any known type. However, in preferred embodiments of the invention, the contact sensor means are of a relatively flexible type and provided so as to extend over an area substantially corresponding to that of the outer face of the module in question, or to a prevalent part thereof. In the non-limiting example of FIG. 6, a contact sensor device is designed as a whole by C and itself has a structure with distinct stacked layers.

In one or more embodiments, the contact sensor device C comprises a layer of electrically insulating material 62, which is set between a lower electrically conductive layer 61 and an upper electrically conductive layer 63, connected to which are respective conductors, designated by "+" and "−". The insulating layer 62 is preferentially made of an elastomer or in any case an elastically compressible material, such as a foamed material, and has an array of through openings. The layers 61 and 63 preferentially each comprise a fabric that is made at least in part of electrically conductive material or is rendered electrically conductive. Merely by way of example, the layers 61 and 63 may, for instance, each comprise a fabric made of copper-plated polyester, possibly coated with nickel, or else a fabric made of silver-plated nylon. It is also possible to use for the layers 61 and 63 two different electrically conductive fabrics, for example of the two types just referred to above, distinguished by different mechanical characteristics. For instance, for the layer 61, which is to be fixed with respect to the cushioning layer 60, it may prove advantageous to use a substantially anelastic conductive fabric, whereas for the layer 63, which is to undergo greater deformation following upon impact in order to come into contact with the layer 61 (as explained hereinafter), it may prove advantageous to use a substantially elastic, preferably bi-elastic, conductive fabric.

In general, it is preferable for the layers 61 and 63 to have a very low surface electrical resistance, indicatively not higher than 100 mΩ.

The layers or fabrics 61-63 are relatively thin (indicatively, the overall thickness of the stacked layers 61-63 does not exceed the 5-6 mm) and are hence intrinsically flexible so as to be adaptable to the underlying profile of the cushioning layer 60, which in turn depends upon the profile of the underlying structure 40. The intermediate layer 62 is thicker than the layers 61 and 63 and, albeit compressible, is stiffer than these. The layer 62 may indicatively have a thickness of between 2 and 4 mm, whereas the layers 61 and 63 may have a thickness indicatively of between 0.10 and 0.30 mm.

Figure 7:
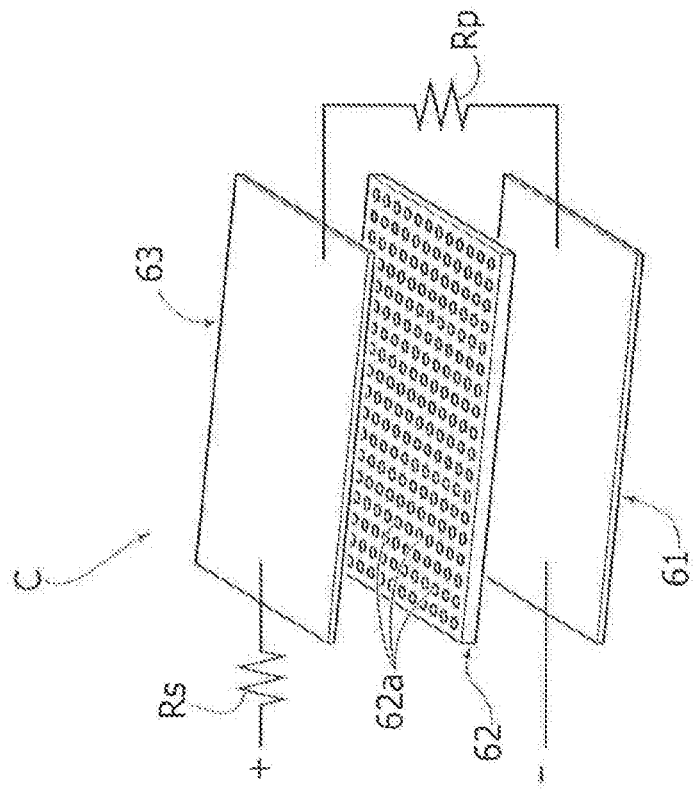
FIG. 7 is an exploded schematic representation of a contact sensor device that can be used in a covering module of a sensorised covering according to possible embodiments of the invention.

The intermediate compressible layer 62 has, as has been said, an array of openings or through holes. With reference to the non-limiting example of FIG. 7, the aforesaid holes—designated by 62*a*—extend for the major part of the layer 62. As may be appreciated, in this way, the electrically conductive layer 61 and the electrically conductive layer 63 locally face one another at the openings 62*a*. It will likewise be appreciated that, in this way, the layer 63 can come into contact with the layer 61 at at least one such through opening 62*a*, following upon deformation of the layer 63 and of the elastically yielding layer 62.

The holes 62 are preferably circular in order to guarantee a greater uniformity, but this does not constitute an essential characteristic. Indicatively, the diameter of the holes 62*a* is between 10 and 20 mm, and their pitch (i.e., the distance from one another) is between 3 and 8 mm.

Figure 8A:
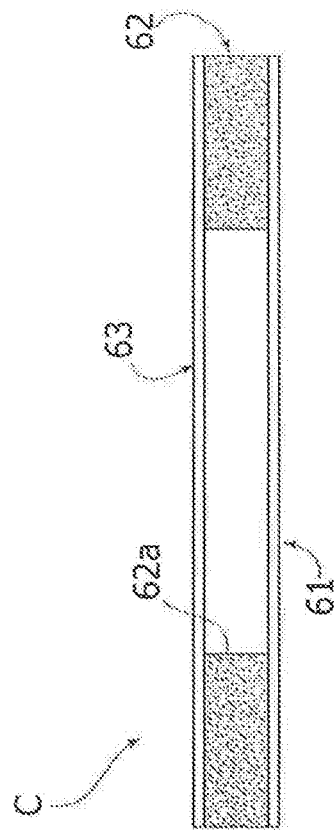
FIGS. 8A and 8B are partial and schematic cross-sectional representations, aimed at illustrating two different conditions of a contact sensor device of the type illustrated in FIG. 7.
Figure 8B:
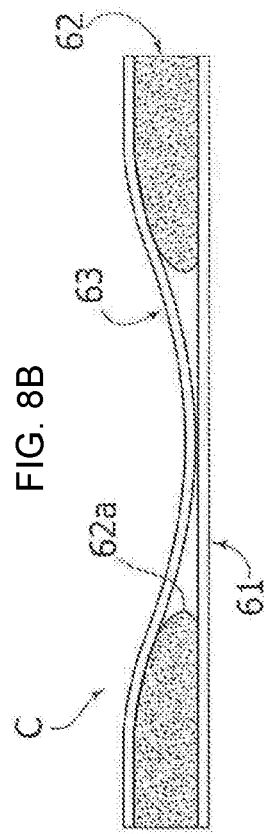

As represented schematically in FIG. 8A, in the absence of a pressure on the sensor device C, the intermediate insulating layer 62 keeps the conductive layers 61 and 63 at a distance from one another, also in the areas of the holes 62*a*, giving rise across the conductors "+" and "−" to an electrical signal that the corresponding control board 50 can interpret as absence of impact on the sensorised module in question. On the other hand, as represented schematically in FIG. 8B, in the presence of impact, i.e., of a pressure, on the sensor device C, the intermediate layer 62 can undergo elastic deformation and enable contact between the layers 61 and 63 at at least one of its through holes 62*a*. There is thus obtained direct electrical conduction between the two layers 61 and 63, with a consequent variation of the aforesaid electrical signal across the conductors "+" and "−", which the corresponding electronic board 50 can interpret as corresponding to impact that has occurred on the sensorised module.

Direct contact of the layer 63 on the layer 61 at one or more holes 62*a*, i.e., switching of the sensor C, is allowed by the deformation of the layer 63 itself and of the yielding layer 62 and depends upon the degree of the impact on the covering 20. In other words, the threshold of switching of the sensor C is a function of the capacity of deformation of the layers overlying the sensor itself. The thickness or, more in general, the characteristics of resistance to deformation of the aforesaid overlying layers is hence chosen so that switching of the sensor C will take place in the case where the respective covering module is involved in an impact that takes place with a kinetic energy higher than a substantially predefined safety threshold. The aforesaid threshold is preferentially chosen so as to prevent serious risks to safety of a human operator in the event of impact with the module in question. Indicatively, the aforesaid threshold—which represents the limit force of impact—may be comprised between 60 N and 200 N. In the case where it is desired to ensure maximum protection, for example for safeguarding also the face of an operator from possible harm, the safety threshold may be comprised between 50 N and 100 N.

Hence, as may be seen, in various preferred embodiments, the contact sensor device C operates substantially as sensor of an ON/OFF type, without the need to establish, for the purposes of detection of presence or absence of impact, particular threshold values of electrical resistance, as is instead typically the case of contact sensors of a piezoelectric type. Moreover, even though the sensor C has an extensive sensing surface, its production cost is decidedly limited, for example, as compared to the aforementioned piezoelectric sensors, with the further advantage of guaranteeing repeatability of detection. Operation of the sensor C does not depend upon the pre-load imposed on its electrically conductive layers 61 and 63 during production of the sensorised module (unlike, for example, piezoresistive fabrics used in piezoelectric sensors, where corresponding to variations of the mechanical tensile stress applied is a variation of the functional characteristics).

In various preferred embodiments, the contact sensor device C includes at least two resistors, of which a first resistor is connected between the two conductive layers 61 and 63, and a second resistor is connected, in particular in series, to the conductor "+" or the conductor "−", the aforesaid resistors being in particular provided for enabling discrimination of possible conditions of malfunctioning of the device C. With reference to the case illustrated in FIGS. 6 and 7, the aforesaid first resistor is designated by Rp, whereas the aforesaid second resistor is designated by Rs. The two resistors preferably have different values of electrical resistance (for example, the resistor Rs may have a value approximately one tenth of the value of the resistor Rp).

In order to clarify this aspect more fully, it is assumed merely by way of example that the resistor Rp has a value of resistance comprised between 3000 and 5000Ω, and that the resistor Rs has a value comprised between 300 and 500Ω.

In the absence of impact or pressure exerted on the device C, i.e., a condition corresponding to that of FIG. 8A, across the conductors "+" and "−" a value of resistance equal to Rp+Rs will be detectable via the corresponding control board 50. On the other hand, in the presence of impact or pressure on the device C, i.e., a condition corresponding to that of FIG. 8B, across the conductors "+" and "−" a value of resistance equal to the value of just the resistor Rs will be detectable via the corresponding control board 50. As mentioned previously, the control board 50 will hence be able to discriminate between the two conditions (presence or absence of impact) on the basis of the different value of resistance detected. In the case where, instead, the board 50 detects an infinite value of resistance, or in any case a value much higher than the normal working range (3300-5500Ω, in the non-limiting example referred to), an operating fault will be present, due for example to an interruption of one of the two conductors "+" and "−", or else due to an undesired disconnection of a connector to which the conductors are connected from the complementary connector provided on the control board 50. If, instead, the board 50 detects a zero value of resistance, or in any case a value much lower than the normal working range (3300-5500Ω, in the non-limiting example referred to), a different operating fault will be present, typically due to a short-circuit between the conductors "+" and "−" themselves or of a corresponding connector.

In preferential embodiments, the contact sensor means of a sensorised covering module, for example a sensor device C as exemplified previously, may be set between a lower covering layer and an upper covering layer, which are made of elastically compressible and electrically insulating material. With reference to the non-limiting example of FIG. 6, the aforesaid lower covering layer is provided by the cushioning layer 60, whereas the upper covering layer is provided by a further cushioning layer, designated by 64, preferably made of an electrically insulating and elastically compressible material. In various embodiments, the layer 64 is substantially the same—as regards material and dimensions—as the cushioning layer 60.

When a load is applied on the cushioning layer 64, for example following upon impact between the covering module in question and a human operator, at least the compressible material of the layer 64 undergoes deformation, thus determining a pressure on the layers 61-63 and thereby activating the contact sensor device C, as explained above.

As has been said, in one or more embodiments, one or more sensorised modules comprise proximity sensor means. When a sensorised module comprises both the contact sensor means and the proximity sensor means, the latter are in a position higher than the former, i.e., in a position more external with respect to the structure 40, which represents the innermost layer of a covering module. On the other hand, not excluded from the scope of the invention is a reverse arrangement, i.e., with the contact sensor means in a position higher than the proximity sensor means.

In the case of sensorised modules that include, instead, only the proximity sensor means, the layers 61-64 of FIG. 6 may be omitted, possibly accordingly increasing the thickness of the cushioning layer 60.

The proximity sensor means may be of any known type, but also these are preferably of a relatively flexible type and obtained so as to have a surface area substantially corresponding to that of the outer face of the module in question or of a predominant part thereof. In the non-limiting example of FIG. 6, a proximity sensor device is designated as a whole by P.

In one or more embodiments, the proximity sensor device P is of a capacitive type and comprises a layer of electrically conductive material. With reference to the non-limiting example of FIG. 6, the aforesaid electrically conductive, sensitive, or active layer for the purposes of proximity detection, is designated by 65.

Preferentially, the layer 65 comprises a fabric that is made of electrically conductive material or is rendered such, for example a fabric made of copper-plated polyester, possibly coated with nickel, or else a fabric made of silver-plated nylon.

In the non-limiting example of FIG. 6, the electrically conductive layer 65 is set on top of the cushioning layer 64.

In a possible practical embodiment, in the proximity sensor device P the conductive layer 65, used as capacitive sensor, is connected to a capacitive detection chip based upon an LC circuit (such as the chip FDC2214 manufactured by Texas Instruments Incorporated, U.S.A.), provided on the control board 50 for acquisition and processing of the data (see the data sheet of the chip referred to above and the correlated application documentation). Basically, when a human operator (or other foreign body) approaches the conductive layer 65, there is a variation of capacitance in the LC circuit, and a consequent variation of an oscillation frequency. Measurement of this variation of frequency, made by the chip, hence indicates the proximity of the human operator (or other foreign body) to the layer 65, i.e., to the outer side of the sensorised covering. As already mentioned, the sensor means P may be configured in such a way that the maximum distance from the layer 65 within which the presence of a foreign body can be detected is approximately 5 cm. On the other hand, it will be appreciated that, for example on the basis of the aforesaid variation of capacitance in the LC circuit and the consequent variation of the oscillation frequency, it is also possible to establish a plurality of thresholds of detection by the proximity sensor device P, which correspond to various distances of a foreign body from the outer side of the sensorised covering (for example, a first threshold PT1 corresponding to a distance of 3 cm from the outermost surface of the covering and to a substantially zero distance from the aforesaid outer surface).

In various embodiments, provided above the proximity sensor means is a further cushioning layer, preferably having a thickness smaller than that of the layers 60 and/or 64. With reference to FIG. 6, hence provided on the sensitive layer 65 is the aforesaid further cushioning layer, designated by 66, made of an electrically insulating and elastically compressible material. The layer 66 is preferentially made of an elastomeric material, such as a foamed material, for example having a thickness of between 2 and 4 mm.

Preferentially, each module comprises an outer coating layer, preferably made of electrically insulating material. With reference to the non-limiting example of FIG. 6, the outer coating layer, designated by 67, may be formed by a paint, preferably a polyurethane-based paint, applied on the outer side of the layer 66. For this purpose, in preferential embodiments, on the aforesaid outer side of the layer 66 a primer may be previously applied, aimed at facilitating adhesion of the painted layer 67. In the case of sensorised modules that include just the contact sensor means C, the coating layer 67 may be applied on the cushioning layer 64 (which has possibly previously been provided with a primer). The coating layer 67 may have a thickness comprised between 0.5 and 1.5 mm, even though a larger thickness thereof is not excluded on the condition that a flexibility or elastic yielding thereof is guaranteed.

In various embodiments, the coating layer 67 extends also at the peripheral sides of the structure constituted by the layers 40, 60-66, in particular as far as the load-bearing structure 40, for example as far as its inner side and/or as far as walls of the type designated by 42-43 in FIGS. 4-5: this does not constitute, however, an essential characteristic. As has been said, in fact, the coating layer is preferentially formed by an appropriate paint, preferably a paint that is not electrically conductive, which coats the outermost side of the multilayer structure of the module.

Also represented schematically in FIG. 6 is the control board 50 of the module 24 exemplified, as well as an arrangement for forced ventilation, designated by 70, for example comprising a fan driven by an electric motor.

In various embodiments, one or more fans 70 may be mounted on parts of the structure of the manipulator 1 covered by the covering 20, with the aforesaid parts that are provided with suitable supports designed for the purpose. On the other hand, according to other embodiments, the fans may be mounted on the inner side of the structure 40 of one or more modules, not necessarily sensorised modules. The presence of these forced ventilation means favours circulation of air within the cavities defined by the covering 20, for example in order to facilitate cooling of components enclosed within the aforesaid cover (such as the boards 50 or the motors M of the joints of the manipulator 1). In order to enable circulation of the cooling air (i.e., suction of air from outside and expulsion of the hotter air to the outside), one or more modules of the covering 20 may be provided with passages, for example in the form of a series of slits, as is represented schematically with a dashed line in FIG. 2.

Operation of the ventilation arrangement 70 may be controlled by the control board 50 of a sensorised module or by the control board 50 to which a plurality of sensorised modules are connected. For this purpose, in possible embodiments, such a board 50 is advantageously provided with a temperature sensor (for example, of an NTC type), in order to activate the ventilation arrangement when the temperature of the air detected within an area circumscribed by the covering 20 reaches or exceeds a predefined threshold.

In various embodiments, for the purposes of production of a sensorised module, such as the module 24 of FIG. 6, the various layers are assembled via glues or adhesives, designed to maintain the layers themselves adherent to one another and prevent possible sliding thereof following upon contact or impact.

As already mentioned, the base layer represented by the load-bearing structure 40 is provided with the shape determined in the design stage, this shape being variable according to the area of the manipulator to be covered.

Next, the cushioning layer 60 is set on the corresponding load-bearing structure 40 and fixed thereto via glue. For this purpose, the layer 60 has a shape and dimensions such as to reproduce at least those of the outer side of the load-bearing structure 40, so as to cover it entirely or practically entirely. The layer 60 may, for example, be cut or dinked from a sheet of the material used. Also the layers 61-63 and the layers 64-66 are provided in the shapes and dimensions necessary, for example via cutting or clinking, and they are then glued together. Glued in succession on the cushioning layer 60 are the layers 61-63, the cushioning layer 64 being then glued on the layer 63. The layers 61-64 are assembled together, for example in the order shown in FIG. 6, preferably using one or more glues having an adhesive capacity that is reduced or in any case lower than that of the glue or glues used for fixing the layer 60 on the structure 40: the purpose of this is not to alter the elasticity of the active layers 61, 63, at the same time obtaining a stable sensor. Of course, application of the glues between the layers 61-63 is such as not to insulate the aforesaid layers electrically from one another. It should be noted that, instead of the use of an added glue, one or more of the layers 61 and 63 may be already prearranged in the production stage so as to have a surface thereof provided with adhesive, equipped with a corresponding pealable film.

Next, also the further active layer 65 and the corresponding upper passive layer 66 are provided in the shapes and dimensions necessary in order to cover an area substantially corresponding to the outer face of the covering module, or to a prevalent part thereof. The layers 65 and 66 are then glued in succession on the layer 64, also in this case preferably using glues with reduced characteristics of adhesiveness, for the reasons explained above in relation to the layers 61-64 (also the layer 65 could possibly be already provided in the production stage so as to present a surface thereof provided with adhesive with pealable film). Finally, the outer coating layer 67 is applied, which, as has been mentioned, can be applied in the form of paint, possibly after application of a primer on the layer 66.

The layered structure described with reference to FIG. 6 may of course be used to obtain all the sensorised modules of the covering 20. As has been mentioned, the sequence and/or number of layers of a module—whether sensorised or not—may even be different from the one described and illustrated by way of example.

FIG. 9 is a schematic illustration of a possible mode of connection of some sensorised modules, such as the modules 23-24 of FIGS. 4-5 and the modules 28-29 of FIG. 2. As already mentioned, provided in implementations of this type are the wiring 51 for connection of the sensor means C and/or P of the various modules to the control boards 50 and the wiring 52 for connection of the various boards 50 to the control unit 15, where the aforesaid wiring 51, 52 includes leads for carrying the electrical supply from the unit 15 to the boards 50, and hence to the corresponding sensor means C and/or P, and for carrying from the boards 50 to the unit 15 the signals corresponding to detections made by the sensor means C and/or P. Of course, the configurations of electrical connection of the covering modules to the control unit 15 may be multiple, according to the design approach adopted. FIG. 9 exemplifies both the case of individual sensorised modules—here the modules 28 and 29—each provided with an electronic control board 50 of its own and the case of a number of sensorised modules—here the modules 23 and 24—connected to one and the same board 50, which hence function as "concentrator". It will be appreciated in any case that, in various embodiments, the configuration of the network used for connecting together the control unit 15 and a plurality of modules may be different from the one exemplified, for example using a bus architecture of a loop type, a star type, daisy-chain type, and so forth.

In various embodiments, one or more control boards 50 are equipped with a wireless communication module, for radiofrequency transmission at least of the signals corresponding to the detections made by the sensor means C and/or P connected. For this purpose, the control unit 15 will be provided with a corresponding wireless communication module. For the purposes of wireless transmission of the data the communication standard deemed most convenient for the application may be used (WiFi, Bluetooth, ZigBee, etc). Likewise, transmission of the data may be carried out according to a suitable standard or proprietary protocol. The wiring between the control unit 15 and the various boards 50 will be used for electrical supply of the boards themselves with the associated communication modules, which may, if so required, also be of a type that is able to manage bidirectional communication. Obviously, in the case of implementation of wireless data communication, the wiring 51, 52 may include only leads for electrical supply of the boards 50 and of the sensor means C and/or P of the various sensorised modules.

The concepts set forth previously as regards construction, operation, and connection of modules of a sensorised covering may be applied to automated devices having one or more movable parts even different from a manipulator of an industrial robot.

For instance, a sensorised covering of the type described above—albeit provided with modules having shapes different from the ones represented in FIGS. 2-5—may advantageously be used for partial covering of robot tools or end effectors. Such a case is exemplified in FIG. 10, where designated as a whole by 100 is a gripping tool or gripper, the load-bearing structure 101 of which includes an attachment part prearranged—according to techniques in themselves known—for mechanical connection and possibly power connection (electrical, or pneumatic, or hydraulic connection) at the flange 9 of the manipulator 1 of FIGS.

1-3. Associated to the structure 101 are suitable actuator means, such as one or more pneumatic cylinders 102 that can be controlled for causing opening and closing of gripping members or jaws—one of which is visible at 103 in FIG. 11—of a piece to be worked or manipulated.

As may be noted, in the schematic example illustrated, associated to the structure 101 are a plurality of covering modules 110, 111 and 112, 113, which provide two sensorised coverings 120 for different areas of the tool 100. In particular, the modules 110 and 111 are designed to envelop an upper portion of the tool 100, closer to the portion of attachment to the flange of the manipulator, whereas the modules 112 and 113 are designed to envelop a lower portion of the tool 100, within which the aforesaid gripping members 103 are movable. It should be noted that, for requirements of greater clarity, the representation of the control board or boards 50, and of the corresponding wiring 51, 52 has been omitted in FIGS. 10 and 11.

Figure 10:
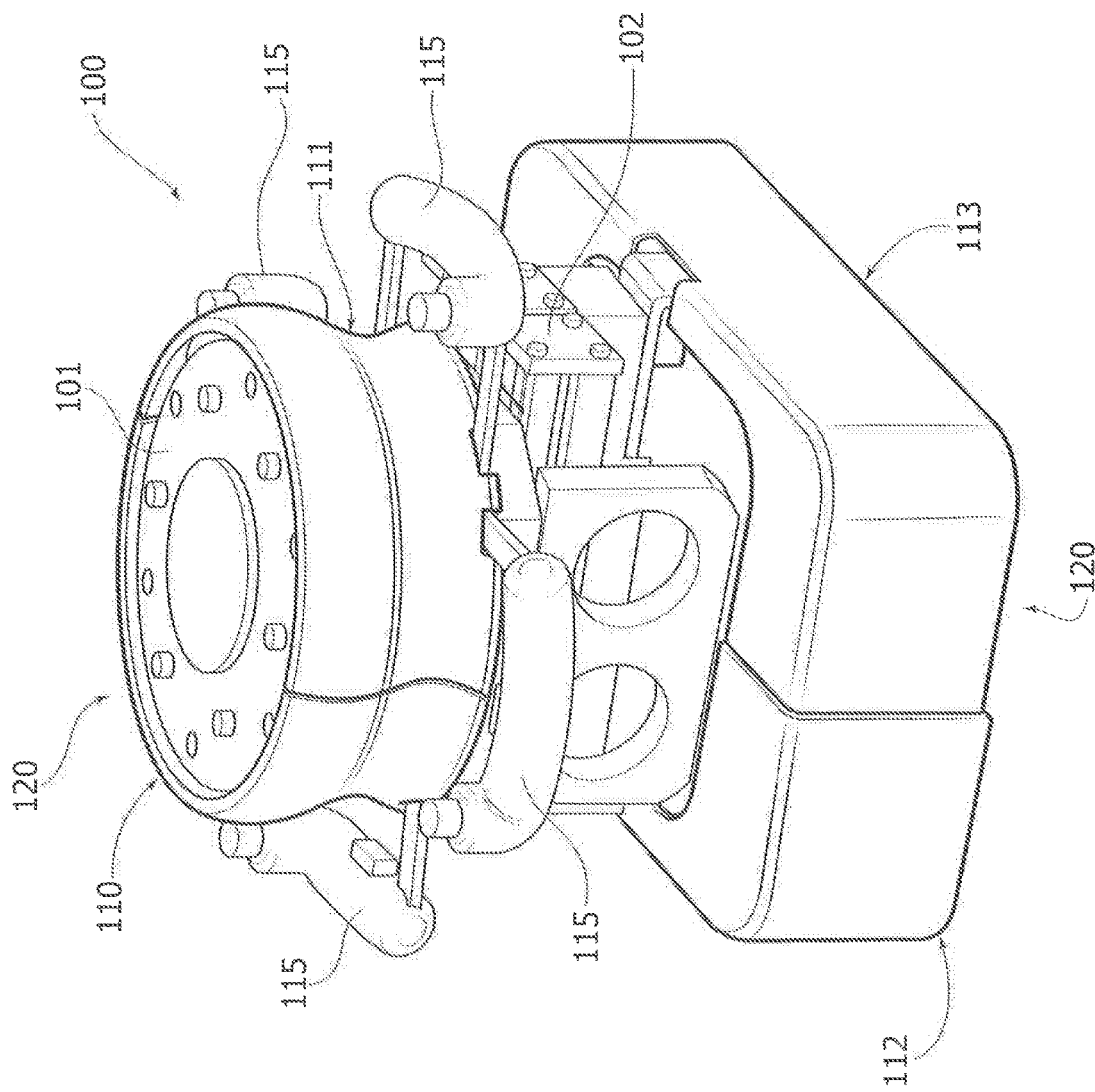
FIG. 10 is a schematic perspective view of another automated device according to possible embodiments.
Figure 11:
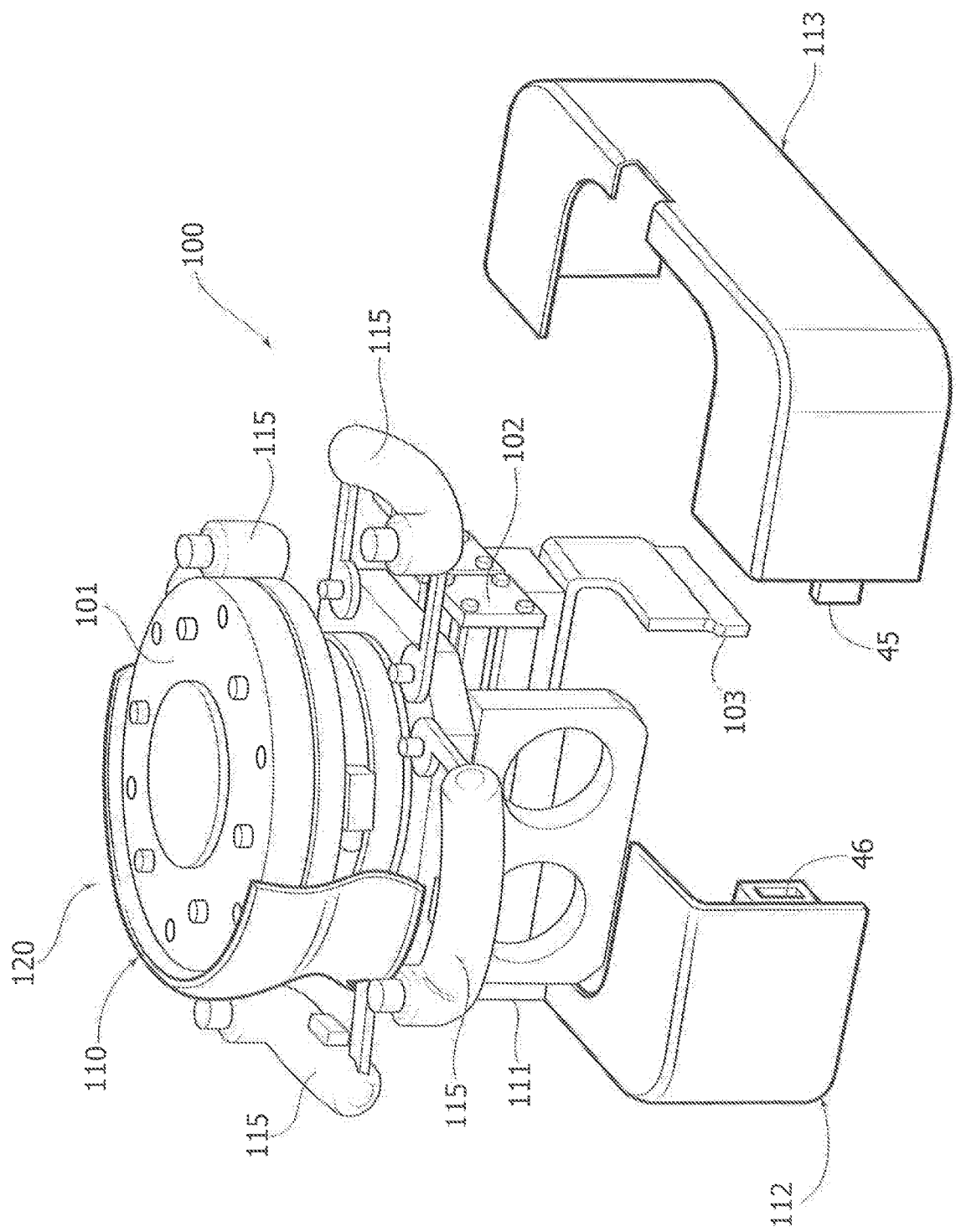
FIG. 11 is a partially exploded schematic view of the device of FIG. 10, with a covering module omitted.

In FIG. 11, the representation of the module 111 has been omitted, whereas the module 113 is represented in a condition where it is separate from the module 112. The modules 110-111 and 112-113 are provided with the respective mechanical and/or electric connector elements, which are able to couple the two modules in question together in the assembled condition, there being partially visible in FIG. 11 only connector elements 45 and 46 of the modules 112-113. The aforesaid mechanical connector elements may possibly be configured also for performing the function of electrical connection between the two modules. In any case, in embodiments of the type exemplified in FIGS. 10 and 11, the modules 110-111 and 112-113 may be provided with respective releasable mechanical connector means, in particular fast-coupling means.

In various embodiments, a robot tool or other end effector, the structure of which is covered at least in part by a sensorised covering of the type described herein is provided for use in strict co-operation with a human operator and includes for this purpose a manual guide device.

For instance, FIGS. 10 and 11 exemplify an embodiment in which such a guide device includes a plurality of grips 115, on each of which the operator can exert a force in a certain direction (pushing, pulling, raising, lowering) to get the manipulator 1 to perform movements corresponding to and necessary for execution of the process. Associated to the grips 115 is a force sensor, which is connected in signal communication to the control unit 15 (in wired or wireless mode) in order to enable the latter to recognise the direction of displacement desired by the operator. Preferentially associated to each knob 115 is a corresponding push-button, for control of switching of the gripping elements 103 between the respective opening and closing positions.

In the case exemplified, four grips 115 are envisaged, at four different sides of the tool 100, in order to enable the human operator to choose each time the grip that he deems most convenient for carrying out the operation to be performed in co-operation with the robot.

Figure 12:
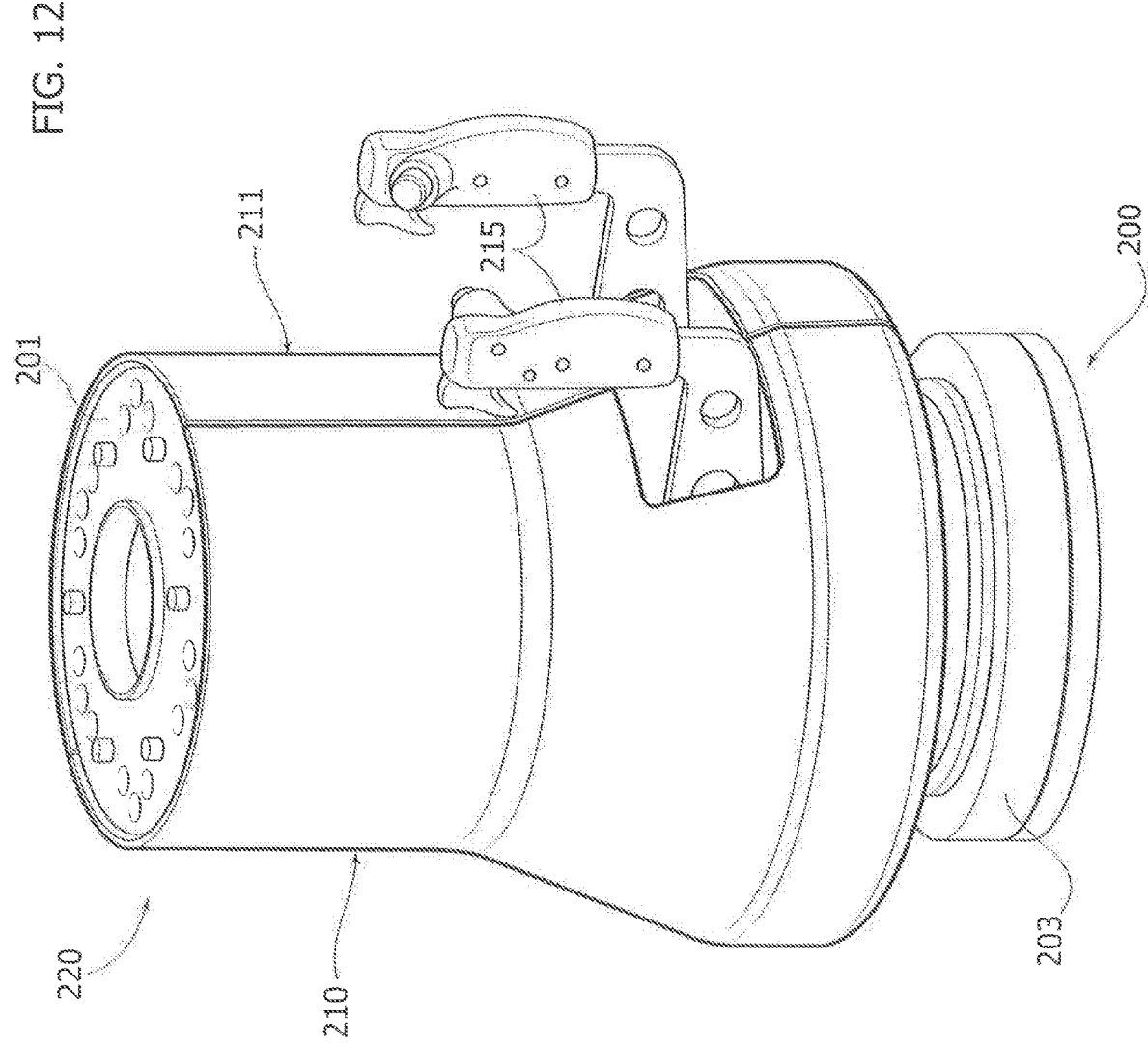
FIG. 12 is a schematic perspective view of a further automated device according to possible embodiments of the invention.
Figure 13:
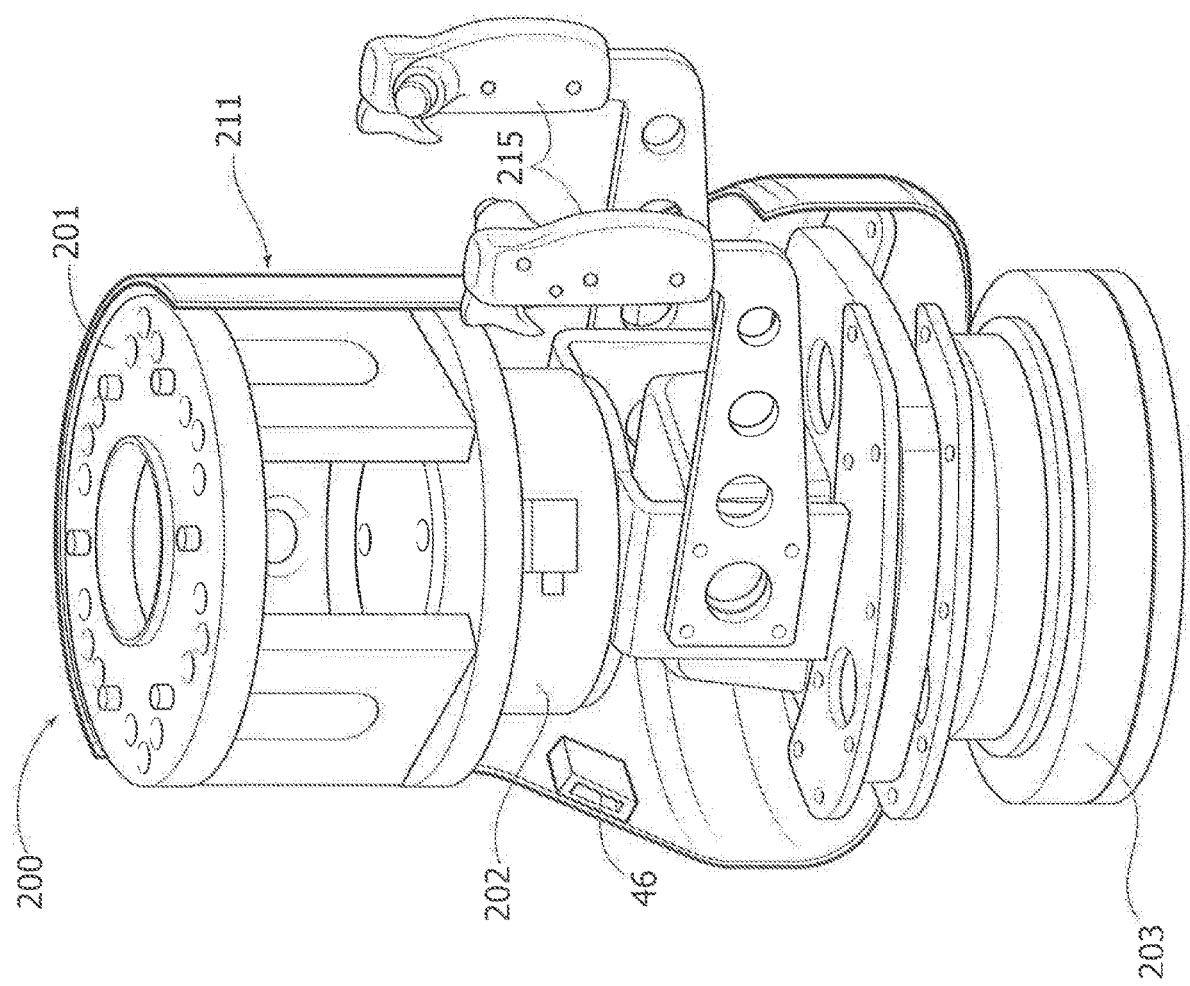
FIG. 13 is a schematic perspective view of the device of FIG. 12, with a covering module omitted.

Exemplified in FIGS. 12 and 13 is a different tool or end effector, designated as a whole by 200, in particular a grinding or polishing tool. Also in this case, the load-bearing structure 201 of the tool 200 includes an attachment part prearranged for connection to the flange 9 of the manipulator 1 of FIGS. 1-3. Associated to the structure 201 are suitable actuator means, such as an electric motor 202, which can be controlled for causing rotation of a disk 203 for abrading or polishing a workpiece. Also in FIGS. 12 and 13, for purposes of greater clarity, the representation of the control board or boards 50, and of the corresponding wiring 51, 52, has been omitted.

In the schematic example illustrated in FIG. 12, associated to the structure 201 are two covering modules 210, 211, aimed at providing a sensorised covering 220 that to a major extent envelops the structure 201, leaving the machining disk 203 exposed. In FIG. 13, where the representation of the module 210 has been omitted, it may be appreciated how also in this case the modules 210-211 are provided with the respective mechanical (and possibly electrical) connector elements, there here being visible just the connector 46 associated to the load-bearing structure of the module 211, with the aforesaid connector elements that are able to couple together the two modules in question in the assembled condition. For the rest the considerations already set forth in relation to the tool 100 of FIGS. 10-11 apply.

In the case exemplified, also the tool 200 is provided with a manual guide device, here including two knobs 215, which are generally parallel and associated to a force sensor in signal communication with the control unit of the robot in order to enable the operator to bring about displacements of the manipulator, and hence of the tool 200, in the desired working direction. Also in this case, the grips each have a corresponding push-button, for control of rotation of the motor 102.

Figure 14:
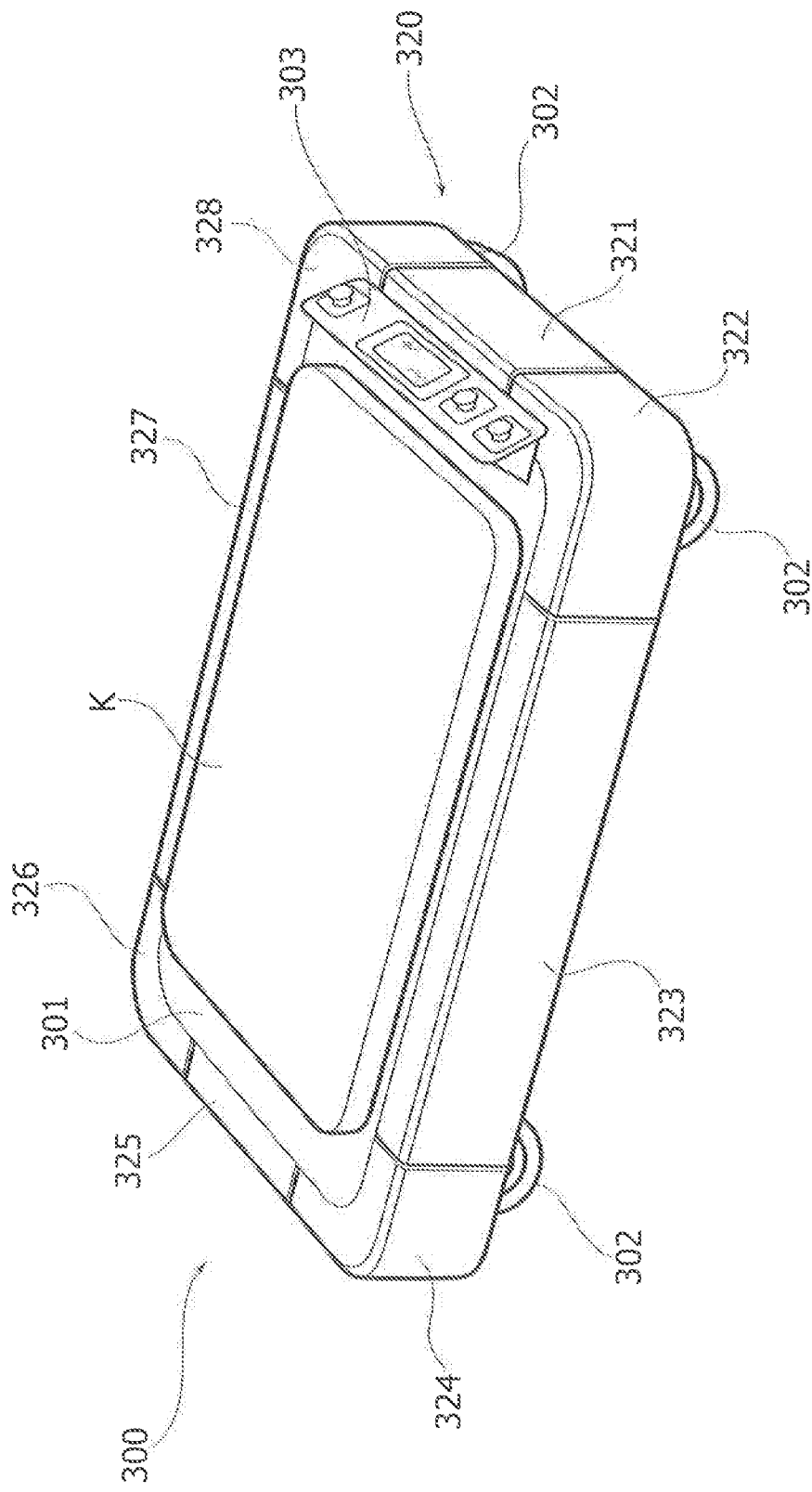
FIG. 14 is a schematic perspective view of a further automated device according to possible embodiments of the invention.

The sensorised covering according to the invention may be applied also to devices for moving components undergoing machining. An example in this sense is illustrated schematically in FIG. 14, where designated as a whole by 300 is an automated guided vehicle (AGV), for transport of a generic piece K in a production context. Associated to the load-bearing structure 301 of the vehicle 300 are wheels 302, some of which are driven in rotation via a suitable motor, preferably an electric motor (not visible). The structure 301 moreover supports a control system 303 of the vehicle, for example comprising a control unit and a user interface for setting operating parameters, according to a technique in itself known. According to the invention, the structure 301 is provided with a sensorised covering, designated as a whole by 320, electrically connected to the aforesaid control unit. Provided in the example is a plurality of covering modules 321-328, preferably but not necessarily all sensorised, shaped in such a way that, in their assembled condition, they substantially surround the structure 301 completely. Preferentially, the top of the structure 301 is instead kept exposed, in order to support thereon the piece K carried. Also in this type of implementations, the principles described previously apply, and hence, for example, provision in at least some of the modules 321-328 of contact sensor means and/or proximity sensor means, and preferably mechanical connector means and possibly electrical connector means, for mechanical and possibly electrical interconnection, respectively, of a number of adjacent modules, and so forth.

The modules illustrated with reference to FIGS. 10-14 may be obtained as the modules described with reference to the previous FIGS. 1-9. The invention may of course be applied also to other types of automated devices used in industrial production and distinguished by the presence of one or more parts subject to movement in areas potentially close to a human operator, such as rotary tables and slides.

In various embodiments, the sensorised covering according to the invention comprises a signalling arrangement, configured for supplying information regarding an operating state thereof, and possibly information regarding the operating state of the automated device on which the covering is installed.

In various preferred embodiments, the aforesaid signalling arrangement is an arrangement of an optical type, which comprises a multicolour light-emitting device, which can be controlled for generating light signals, the colour of which and/or the modality of emission of which (continuous or intermittent) depend/depends upon the type of information that is to be supplied.

For instance, it may be assumed that a generic light-emitting device of an RGB type is associated to a sensorised covering according to the invention, mounted on a robot, for example of the type described previously.

Continuous emission of light with a first colour (for example, blue) may be understood as indicating that the robot is in a collaborating state, i.e., in an "automatic" or "remote" operating mode that envisages the presence of a human operator in the vicinity of the robot, on which a reduced speed of displacement of the corresponding manipulator is imposed. The emission of light with the same colour, but flashing or intermittent, may be understood as indicating that the robot is in a state of manual guide by a human operator, for example obtained via the guide devices 115 or 215 of FIGS. 9-10 and 11-12, respectively, also in this case a reduced speed of displacement of the manipulator being imposed.

Continuous emission of light with a second colour (for example red) may be understood as indicating that an impact on the sensorised covering has occurred, detected via the contact sensor means C, whereas emission of light with the same colour, but flashing or intermittent, may be understood as indicating the presence of a foreign body, including an operator, within a distance from the sensorised covering that can be detected via the on which a reduced speed of displacement is imposed).

Emission of light with a third colour (for example, green) may be understood as indicating that the robot is operating in an "automatic" or "remote" operating mode at normal (i.e., not reduced) speed, which does not envisage the presence of a human operator in the vicinity of the manipulator. For this purpose, the working area of the manipulator may, for example, be equipped with a known system for detecting the possible presence of an operator, such as a scanner laser system (in the aforesaid cases, following upon detection of the presence of an operator, the control unit of the robot may, for example, interrupt operation of the robot itself or else impose on the manipulator the aforesaid reduced speed of displacement).

Absence of emission of light may finally be understood as indicating that the robot is in a "programming" mode.

The logic that supervises control of the light-emitting device is preferentially implemented in the control unit of the robot, such as the unit 15 of FIG. 1.

In various embodiments, the light-emitting device comprises one or more RGB LED strips, which can be mounted on the outer side of the sensorised covering or else on its inner side, or once again on an underlying structure, at suitable slits or gaps of the cover itself.

For instance, exemplified in FIGS. 2 and 3 is the case of an RGB LED strip, represented schematically dashed and designated by 80, which is mounted underneath the covering 20, substantially in positions corresponding to mutually facing parts of two modules of the covering itself (in the example, the modules 31 and 32). In a such a type of implementation, the facing parts of the two modules in question may be shaped so as to define between them a slit having a width sufficient to ensure that the light emitted by the LED strip 80 will be visible from outside the covering; in FIGS. 2 and 3 such a slit is designated by 81. In the case exemplified, the LED strip 80 can be fixed in position on the structure of the manipulator 1, for example via purposely provided brackets. Obviously possible are other mounting configurations, for example on the structure 40 of a module; as has been said, the light emitter 80 could also be mounted on the outer side of the covering 20. It is of course possible to mount a number of light emitters 80 in different parts of the manipulator in order to ensure that the light signals are visible from a number of sides.

What has been described in relation to the optical signalling arrangement, and exemplified in relation to a robot, may be implemented also in other automated devices, such as the devices of FIGS. 10-11, 12-13 and 14.

FIGS. 15, 16, and 17 are schematic illustrations of some possible conditions of detection by a sensorised covering according to the invention, installed, for example, on a robot of the type described with reference to FIGS. 1-9. In these figures, the covering, designated by 20, is represented only schematically. The lines PT1 and PT2 represent schematically two possible predefined detection thresholds for the proximity sensor means (P) of the covering, which may, for example, correspond to a distance of approximately 5 cm and approximately 0.5 cm, respectively, from the outermost surface of the covering. The line CT represents schematically a triggering threshold of the contact sensor means (C) of the covering (the aforesaid threshold CT may, for example, be understood as the deformation threshold of the layers 62-67 of FIG. 6 necessary for causing switching of the sensor device C of FIGS. 6-8).

FIG. 15 illustrates the case where a human operator HO happens to be within a distance from the covering 20 that is within the range of the threshold PT1 (5 cm, in the non-limiting example). Following upon the aforesaid detection, the control unit 15 issues a command for stopping movement of the manipulator 1. In such a case, if within a certain pre-set time (for example, from 2 to 5 s), the unit 15 does not detect (via the sensor means C) an impact on the covering 20, movement of the manipulator 1 is resumed. The threshold or distance PT1 is preferably configurable, for example according to the type of application of the robot.

FIG. 16 illustrates, instead, the case where a human operator HO happens to be within a distance from the covering 20 that is within the range of the threshold PT2 (0.5 cm, in the non-limiting example), or, in practice, in a condition where he has brushed against or has come into slight contact with the outer surface of the covering. Also following upon such a detection, the control unit 15 issues a command for stopping movement of the manipulator 1. Also in this case, if within a certain pre-set time (for example, from 2 to 5 s), the unit 15 does not detect (via the sensor means C) an impact on the covering 20, the movement of the manipulator 1 is resumed. The threshold or distance PT2 is preferably a non-modifiable threshold, in so far as it represents a critical condition, i.e., contact or quasi-contact of the covering with a foreign body. In other words, the threshold PT1 can be considered as a functional threshold, i.e., a threshold that can be freely established on the basis of the type of application of the robot or of certain functions that are to be assigned to the sensorised covering, whereas the threshold PT2 is a safety threshold, which is designed to guarantee safety of a human operator.

Finally, FIG. 17 illustrates the case where there is an impact on the covering 20, such as to cause switching of the contact sensor means C (threshold TC), as well as, evidently, detection of proximity represented by overstepping of both of the thresholds PT1 and PT2. In this event (signals from both of the sensors P and C), the control unit 15 stops movement of the manipulator 1, which may, for example, be restarted only by operating on a specific control element (for example, a start or reset push-button) present on the control unit 15.

As mentioned previously, the conditions corresponding to FIGS. 15 and 16 may be signalled visually by a light-emitting device, such as the LED strip 80, with a first predefined modality of light emission (for example, flashing red light), whereas the condition corresponding to the part C) of FIG. 15 may be signalled with a second predefined modality of emission of light (for example, a light of a different colour, or else once again a red light, but emitted continuously). As has been said, other colours and/or modalities of switching-on/switching-off of the emitter 80 may be used for signalling other states of the covering and/or of the robot (for example, as exemplified above, a continuous blue light to indicate a collaborating state, an intermittent blue light to indicate a manual-guide state, a continuous green light to indicate a non-collaborating "automatic" or "remote" operating mode, absence of emission of light to indicate a "programming" mode).

From the foregoing description, the characteristics of the present invention emerge clearly, as likewise do its advantages.

The modular nature of the sensorised covering described enables multiple configurations to be obtained, with the possibility of sensorising substantially the entire movable structure of an automated device or else only a part thereof, according to the type of application. The solution enables convenient installation of the covering modules, and an equally convenient removal thereof in the case of need. The presence of a load-bearing structure enables definition of the shape of the individual modules according to the application, with the possibility of providing sensorised coverings for various types of automated devices. The shell-like nature of the load-bearing structures of the modules enables definition of spaces useful for housing electrical/electronic parts of the covering system and of parts of the automated device, as well as being exploitable for the purposes of ventilation.

The presence of the sensor means integrated in at least some of the modules of the covering enables detection of contacts and/or approach of foreign bodies to the covering itself, as well as identifying which area of the covering is involved in the contact with the foreign body or in approach of the latter, with the possibility of governing implementation of consequent corrective actions. The sensor means, in particular the contact sensor means, present a simple structure and construction and do not require particular calibrations, albeit guaranteeing a high reliability and repeatability and precision of intervention. Also the functions of passive safety are ensured, thanks to the presence of one or more elastically compliant layers, which are hence able to absorb impact and prevent or limit negative consequences thereof.

The presence of a signalling arrangement makes it possible to supply in a simple and intuitive way information on operating states or conditions of the sensorised covering, including detection of the type of contact or impact, and possibly information on the operating state of the automated device on which the covering itself is installed.

It is clear that numerous variations may be made by the person skilled in the branch to the sensorised covering and to the automated device described by way of example, without thereby departing from the scope of the invention as defined by the ensuing claims.

The invention may be applied on industrial robots of different dimensions and loads, and hence both robots for modest loads (for example, just a few kilograms) and robots for heavy loads (for example, hundreds of kilograms), as well as on robots of a type different from the anthropomorphic ones exemplified herein, for example robots with a cartesian configuration, a cylindrical configuration, a polar configuration, or a SCARA (Selective Compliance Assembly Robot Arm) configuration.

One or more passive layers previously referred to, for example the cushioning layers 60 and/or 64, may in turn be constituted by a number of layers of material set on top of one another and rendered fixed with respect to one another, for example via gluing.

The invention claimed is:

1. An automated device comprising:
a movable structure;
actuator means operable to cause displacements of the movable structure;
a control system operable to control the actuator means; and
a sensorised covering which covers at least part of the movable structure,
wherein the sensorised covering comprises a plurality of covering modules, which include one or more sensorised covering modules each having a contact sensor device,
wherein each sensorised covering module has a structure that comprises a plurality of superimposed distinct layers, which comprises a load-bearing layer made of rigid or semi-rigid material, having a predefined shape, and at least one cushioning layer made of elastically compressible material, carried by the load-bearing layer,
wherein the contact sensor device further comprises a first lower electrically conductive layer and a second upper electrically conductive layer between which an electrically insulating layer is set,
wherein the electrically insulating layer of the contact sensor device is made of an elastically compressible material and has a plurality of through openings arranged in such a way that the first lower electrically conductive layer and the second upper electrically conductive layer locally face each other at said through openings,
the contact sensor device further comprising:
a first electrical conductor (−) and a second electrical conductor (+) connected to the first lower electrically conductive layer and to the second upper electrically conductive layer, respectively, for applying a potential difference between them; and
at least two resistors comprising a first resistor connected between the first lower electrically conductive layer and the second upper electrically conductive layer, and a second resistor connected to one of the first electrical conductor (−) or the second electrical conductor (+),
wherein the first resistor and the second resistor having different values of electrical resistance, a value of electrical resistance of the first resistor being higher than a value of electrical resistance of the second resistor,
wherein the first lower electrically conductive layer and the second upper electrically conductive layer each comprise an electrically conductive fabric, the second upper electrically conductive layer being more elastic than the first lower electrically conductive layer.

2. The automated device according to claim 1, further comprising an optical-type signalling arrangement operable to supply a user with visual information representing at least one condition detectable via the contact sensor device, the optical-type signalling arrangement comprising at least one multicolour light-emitting device operable to generate visible light signals, the colour and/or modality of emission of which is dependent upon the type of visual information that is to be supplied to the user.

3. The automated device according to claim 2, wherein the at least one multicolour light-emitting device comprises an RGB LED strip.

4. The automated device according to claim 1 wherein the plurality of covering modules comprises a first covering module and a second covering module, wherein the load-bearing layer of the first and the second covering modules each further comprising:
a connector element operable to one of cooperatively mechanically or electrically connect the first and the second covering modules positioned adjacent to one another together in a separable way, the load-bearing layer of a first covering module having at least one surface or wall facing a corresponding surface or wall of the adjacent second covering module, the respective connector elements being associated to the surface or wall of the first covering module and to the surface or wall of the second covering module.

5. The automated device according to claim 1, wherein the plurality of distinct superimposed layers further comprises:
the at least one cushioning layer further comprising:
a lower cushioning layer set underneath the contact sensor device, made of elastically compressible material and associated to an outer side of the load-bearing layer; and
an upper cushioning layer set on top of the contact sensor device, made of elastically compressible material; and
an outer coating layer made of electrically insulating material and defining at least part of an outer surface of a respective covering module.

6. The automated device according to claim 1, wherein the distinct superimposed layers that extend outward of the load-bearing layer are at least one of flexible or have a surface area substantially corresponding to a surface area of an outer face of the corresponding covering module.

7. The automated device according to claim 1, wherein the load-bearing layer defines a free gap between an inner side thereof and an underlying part of the movable structure, the free gap operable to one of house components or for defining ventilation passages.

8. The automated device according to claim 1 wherein the one or more sensorised covering modules comprises a plurality of sensorised covering modules, the automated device further comprising at least one electronic control board, one of the at least one electronic control boards connected to one of:
the contact sensor device of a single of the plurality of sensorised covering modules, or
the contact sensor device of a plurality of sensorised modules, the at least one electronic control board being in signal communication with a control unit of the control system of the automated device.

9. The automated device of claim 1, wherein the automated device comprises a robot.

10. The automated device according to claim 1, wherein at least one of the one or more sensorised covering modules integrates at least one proximity sensor device each comprising at least one respective layer of electrically conductive material comprising an electrically conductive fabric.

11. The automated device of claim 1, wherein the automated device comprises one of an end effector or an automated guided vehicle.

12. An automated device comprising:
a movable structure;
actuator means operable to cause displacements of the movable structure:
a control system operable to control the actuator means; and
a sensorised covering which covers at least part of the movable structure,
wherein the sensorised covering comprises a plurality of covering modules, which include one or more sensorised covering modules each having a contact sensor device,
wherein each sensorised covering module has a structure that comprises a plurality of superimposed distinct layers, which comprises a load-bearing layer made of rigid or semi-rigid material, having a predefined shape, and at least one cushioning layer made of elastically compressible material, carried by the load-bearing layer,
wherein the contact sensor device further comprises a first lower electrically conductive layer and a second upper electrically conductive layer between which an electrically insulating layer is set,
wherein the electrically insulating layer of the contact sensor device is made of an elastically compressible material and has a plurality of through openings arranged in such a way that the first lower electrically conductive layer and the second upper electrically conductive layer locally face each other at said through openings, and
wherein at least one of the one or more sensorised covering modules integrates at least one proximity sensor device each comprising at least one respective layer of electrically conductive material comprising an electrically conductive fabric.

13. The automated device according to claim 12, wherein the one or more sensorised covering modules comprise a plurality of said sensorised covering modules connected in signal communication with a control unit of the control system and configured for supplying signals or data representing detections made via the respective each contact sensor device and the proximity sensor device, the control unit operable to identify the sensorised covering module that supplies said signals or data.

14. The automated device according to claim 12 further comprising an optical-type signalling arrangement operable to supply a user with visual information representing at least one condition detectable via the contact sensor device, the optical-type signalling arrangement comprising at least one multicolour light-emitting device operable to generate visible light signals, the colour and/or modality of emission of which is dependent upon the type of visual information that is to be supplied to the user.

15. The automated device of claim 12, wherein the automated device comprises a robot.

16. An automated device comprising:
a movable structure;
actuator means operable to cause displacements of the movable structure;
a control system operable to control the actuator means; and a sensorised covering which covers at least part of the movable structure, wherein the sensorised covering comprises a plurality of covering modules, which include one or more sensorised covering modules each having a contact sensor device, wherein each sensorised covering module has a structure that comprises a plurality of superimposed distinct layers, which comprises a load-bearing layer made of rigid or semi-rigid material, having a predefined shape, and at least one cushioning layer made of elastically compressible material, carried by the load-bearing layer, wherein the contact sensor device further comprises a first lower electrically conductive layer and a second upper electrically conductive layer between which an electrically insulating layer is set, wherein the electrically insulating layer of the contact sensor device is made of an elastically compressible material and has a plurality of through openings arranged in such a way that the first lower electrically conductive layer and the second upper electrically conductive layer locally face each other at said through openings, the contact sensor device further comprising:
- a first electrical conductor (−) and a second electrical conductor (+) connected to the first lower electrically conductive layer and to the second upper electrically conductive layer, respectively, for applying a potential difference between them; and
- at least two resistors comprising a first resistor connected between the first lower electrically conductive layer and the second upper electrically conductive layer, and a second resistor connected to one of the first electrical conductor (−) or the second electrical conductor (+), wherein the first resistor and the second resistor having different values of electrical resistance, a value of electrical resistance of the first resistor being higher than a value of electrical resistance of the second resistor.

* * * * *